United States Patent
Sreenivasan et al.

(10) Patent No.: US 11,469,131 B2
(45) Date of Patent: Oct. 11, 2022

(54) HETEROGENEOUS INTEGRATION OF COMPONENTS ONTO COMPACT DEVICES USING MOIRE BASED METROLOGY AND VACUUM BASED PICK-AND-PLACE

(71) Applicant: Board of Regents, The University of Texas System, Austin, TX (US)

(72) Inventors: Sidlgata V. Sreenivasan, Austin, TX (US); Paras Ajay, Austin, TX (US); Aseem Sayal, Austin, TX (US); Mark McDermott, Austin, TX (US); Shrawan Singhal, Austin, TX (US); Ovadia Abed, Austin, TX (US); Lawrence Dunn, Austin, TX (US); Vipul Goyal, Austin, TX (US); Michael Cullinan, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 537 days.

(21) Appl. No.: 16/472,766

(22) PCT Filed: Dec. 22, 2017

(86) PCT No.: PCT/US2017/068328
§ 371 (c)(1),
(2) Date: Jun. 21, 2019

(87) PCT Pub. No.: WO2018/119451
PCT Pub. Date: Jun. 28, 2018

(65) Prior Publication Data
US 2021/0134640 A1    May 6, 2021

Related U.S. Application Data

(60) Provisional application No. 62/438,952, filed on Dec. 23, 2016.

(51) Int. Cl.
*H01L 21/683* (2006.01)
*G06F 30/392* (2020.01)
(Continued)

(52) U.S. Cl.
CPC ........ *H01L 21/6835* (2013.01); *B81C 99/002* (2013.01); *G06F 30/392* (2020.01);
(Continued)

(58) Field of Classification Search
CPC ............. H01L 21/6835; H01L 21/6838; H01L 23/544; H01L 2221/68309;
(Continued)

(56) References Cited

U.S. PATENT DOCUMENTS 5,360,752 A    11/1994    Brady et al.
6,589,594 B1 *  7/2003    Hembree .......... H01L 21/76898
                                              257/E21.597
(Continued)

FOREIGN PATENT DOCUMENTS

JP    2010161211 A    7/2010
JP    2014011283 A    1/2014
(Continued)

OTHER PUBLICATIONS

Extended European Search Report for European Patent Application No. 17 883 241.6 dated Oct. 27, 2020, pp. 1-10.
(Continued)

*Primary Examiner* — Robert G Bachner
(74) *Attorney, Agent, or Firm* — Robert A. Voigt, Jr.; Shackelford, Bowen, McKinley & Norton, LLP

(57) ABSTRACT

A method for assembling heterogeneous components. The assembly process includes using a vacuum based pickup
(Continued)

mechanism in conjunction with sub-nm precise more alignment techniques resulting in highly accurate, parallel assembly of feedstocks.

23 Claims, 43 Drawing Sheets

(51) Int. Cl.
    *G06F 30/398*     (2020.01)
    *G06F 30/396*     (2020.01)
    *B81C 99/00*     (2010.01)
    *H01L 23/544*     (2006.01)
    *G06F 117/10*     (2020.01)

(52) U.S. Cl.
    CPC .......... *G06F 30/396* (2020.01); *G06F 30/398* (2020.01); *H01L 21/6838* (2013.01); *H01L 23/544* (2013.01); *G06F 2117/10* (2020.01); *H01L 2221/68309* (2013.01); *H01L 2221/68322* (2013.01); *H01L 2221/68354* (2013.01); *H01L 2221/68368* (2013.01); *H01L 2221/68381* (2013.01); *H01L 2223/54426* (2013.01); *H01L 2223/54473* (2013.01)

(58) Field of Classification Search
    CPC . H01L 2221/68322; H01L 2221/68354; H01L 2221/68368; H01L 2221/68381; H01L 2223/54426; H01L 2223/54473; B81C 99/002; G06F 30/392; G06F 30/396; G06F 30/398; G06F 2117/10
    See application file for complete search history.

(56) References Cited

U.S. PATENT DOCUMENTS

| | | | |
|---|---|---|---|
| 6,867,495 B2 | 3/2005 | Czagas et al. | |
| 7,064,078 B2 | 6/2006 | Liu et al. | |
| 2004/0189996 A1* | 9/2004 | Sreenivasan | B82Y 10/00 356/401 |
| 2006/0057520 A1* | 3/2006 | Saia | F24C 3/12 126/39 BA |
| 2010/0155880 A1 | 6/2010 | Ban et al. | |
| 2011/0244629 A1* | 10/2011 | Gong | H01L 23/49582 438/111 |
| 2012/0313241 A1 | 12/2012 | Bower | |
| 2013/0027159 A1 | 1/2013 | Peirine et al. | |
| 2013/0300812 A1 | 11/2013 | Bibl et al. | |
| 2014/0084240 A1 | 3/2014 | Hu et al. | |
| 2015/0371874 A1 | 12/2015 | Bower et al. | |
| 2016/0233206 A1* | 8/2016 | Morrow | H01L 21/6835 |

FOREIGN PATENT DOCUMENTS

| | | |
|---|---|---|
| JP | 2015106671 A | 6/2015 |
| KR | 20100054030 A | 5/2010 |
| KR | 101614370 B1 | 4/2016 |

OTHER PUBLICATIONS

Clermidy et al., "New Perspectives for Multicore Architectures Using Advanced Technologies," IEEE International Electron Devices Meetings, Dec. 3, 2016, pp. 1-4.
SPTS, "Introduction to HF Vapor Etch," https://www.orbotech.com/assets/media/hf-intro-new-webpage.pdf, 2004, pp. 1-2.
Written Opinion of the International Searching Authority for International Application No. PCT/US2017/068328 dated Apr. 30, 2018, pp. 1-7.
International Search Report for International Application No. PCT/US2017/068328 dated Apr. 30, 2018, pp. 1-4.
Euclid Eberle Moon, "Interferometric-Spatial-Phase Imaging for Sub-Nanometer Three-Dimensional Positioning," Department of Electrical Engineering and Computer Science, Massachusetts Institute of Technology, Sep. 2004, pp. 1-206.
Huang et al., "3D Self-Aligned Microassembled Electrical Interconnects for Heterogeneous Integration," Proceedings of SPIE, vol. 4981, 2003, pp. 189-201.
Das et al., "A Multiscale Assembly and Packaging System for Manufacturing of Complex Micro-Nano Devices," IEEE Transactions on Automation Science and Engineering, vol. 9, No. 1, Jan. 2012, pp. 160-170.
Akazawa et al., "Formation of Silicon-on-Insulator Layer with Midair Cavity for Meniscus Force-Mediated Layer Transfer and High-Performance Transistor Fabrication on Glass," Japanese Journal of Applied Physics, vol. 54, 086503, 2015, pp. 1-7.
Westphalen et al., "Automated Alignment of Fast-Axis Collimator Lenses for High-Power Diode Laser Bars," Proceedings of SPIE, vol. 8965, 2014, pp. 1-6.
Snyder et al., "Automated Tuning of High-Order Waveforms for Picoliter Resolution Jetting of Rheologically Challenging Materials," Precision Engineering, https://doi.org/10.1016/j.precisioneng. 2018.11.009, Nov. 9, 2018, pp. 143-155, see p. 143.
Bakke et al., "Etch Stop Materials for Release by Vapor HF Etching," 2005, pp. 1-4.
Cherala et al., "Nanoscale Magnification and Shape Control System for Precision Overlay in Jet and Flash Imprint Lithography," IEEE/ASME Transactions on Mechatronics, vol. 20, No. 1, Feb. 2015, pp. 122-132.
Benjamin Lee, "Introduction to +-12 Degree Orthogonal Digital Micromirror Devices (DMDs)," Chapter 1, Jul. 2008, Revised Feb. 2018, pp. 1-12.
Ebe et al., "UV Curable Pressure-Sensitive Adhesives for Fabricating Semiconductors. I. Development of Easily Peelable Dicing Tapes," Journal of Applied Polymer Science, vol. 90, 2003, pp. 436-441.
Air Products, "Epoxy Curing Agents," 2015, pp. 1-38.
Li et al., "Formation of Through Silicon Vias for Silicon Interposer in Wafer Level by Metal-Assisted Chemical Etching," IEEE Transactions on Components, Packaging and Manufacturing Technology, vol. 5, No. 8, Aug. 2015, pp. 1039-1049.
Zhong et al., "Growth of Ultrahigh Density Single-Walled Carbon Nanotube Forests by Improved Catalyst Design," ACS Nano, vol. 6, No. 4, 2012, pp. 2893-2903.
Ho et al., "Structured ASIC: Methodology and Comparison," IEEE, 2010, pp. 377-380.
Ghadiri et al., "Microassembly of Complex and Three-Dimensional Microstructures Using Holographic Optical Tweezers," Journal of Micromechanics and Microengineering, vol. 22, 2012, pp. 1-8.
X-Celeprint, "Micro-Transfer Printing," 2019, pp. 1-3.
Pawan Kumar Nimmakayala, "Development of a Compliant Pin Chuck for Minimizing the Effect of Backside Particles on Wafer Planarity," Thesis, The University of Texas at Austin, Spring 2004, pp. 1-134.
Chetan R. Patel, "An Architectural Exploration of via Patterned Gate Arrays," Master of Science in Electrical and Computer Engineering, Carnegie Mellon University, May 2003, pp. 1-24.
Lai et al., "Schottky Barrier Catalysis Mechanism in Metal-Assisted Chemical Etching of Silicon," Applied Materials & Interfaces, vol. 8, No. 14, 2016, pp. 8875-8879.
Moon et al., "Thermally Controlled Alignment for Wafer-Scale Lithography," Journal of Micro/Nanolithography, MEMS, and MOEMS, vol. 12, No. 3, 031109, Jul.-Sep. 2013, pp. 1-5.
James Hermanowski, "Thin Wafer Handling—Study of Temporary Wafer Bonding Materials and Processes," IEEE, 2009, pp. 1-5.
Vandelli et al., "Development of a MEMS Microvalve Array for Fluid Flow Control," Journal of Microelectromechanical Systems, vol. 7, No. 4, Dec. 1998, pp. 395-403.

\* cited by examiner

LITHO + ETCH OF DIELECTRIC LAYER

CONFORMALLY COATED ENCAPSULATION LAYER

LITHO + ETCH OF ACCESS HOLES

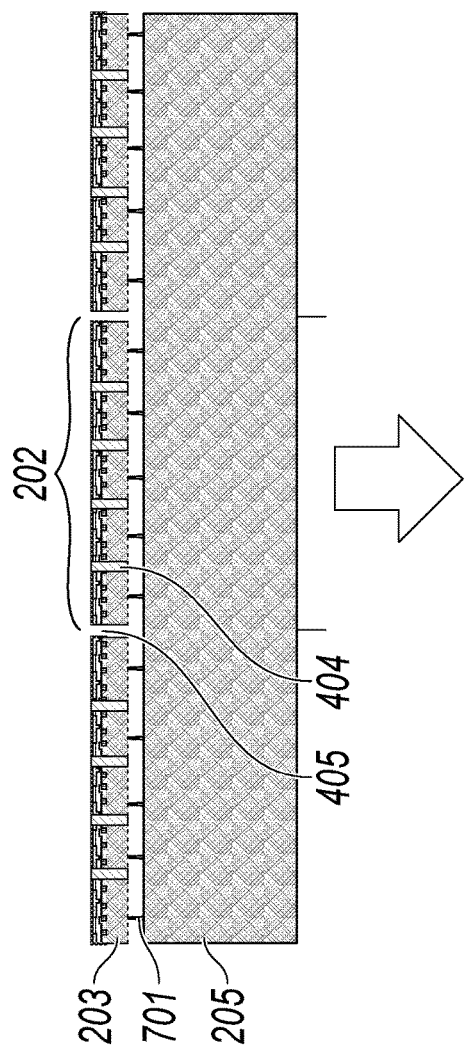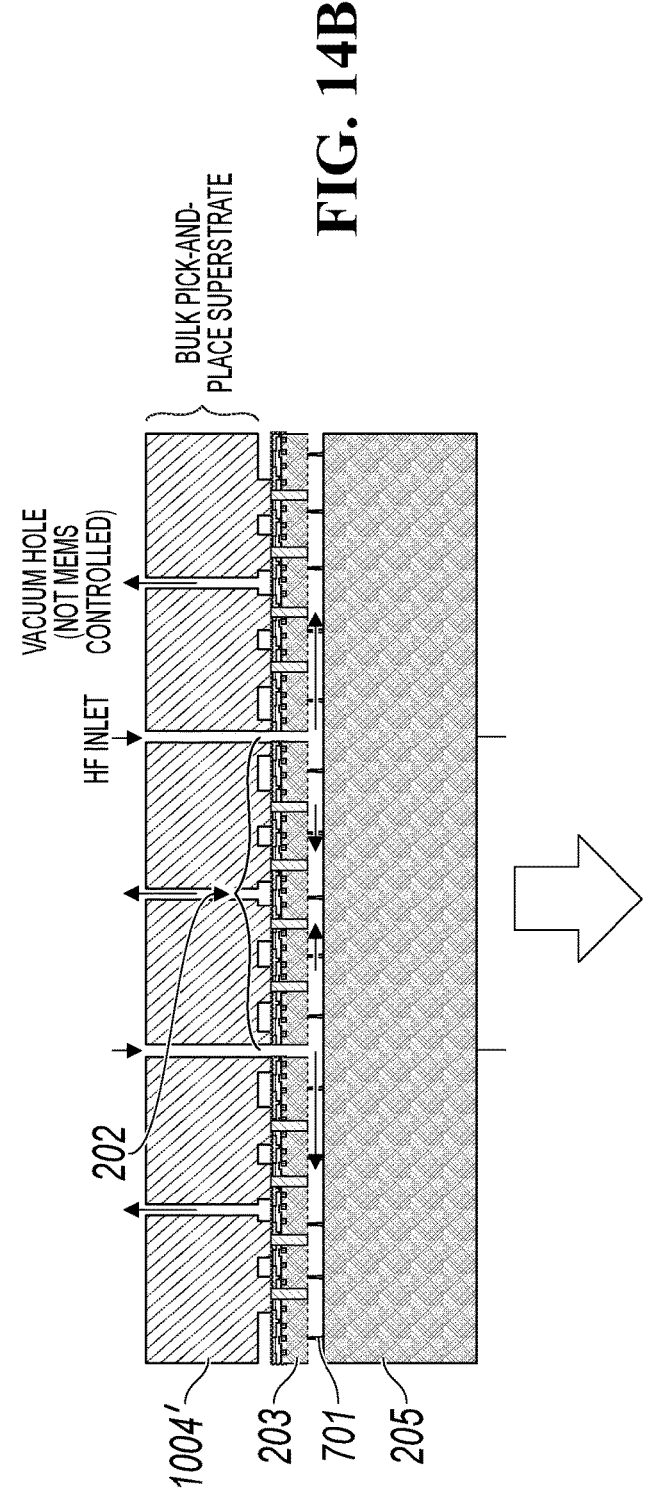

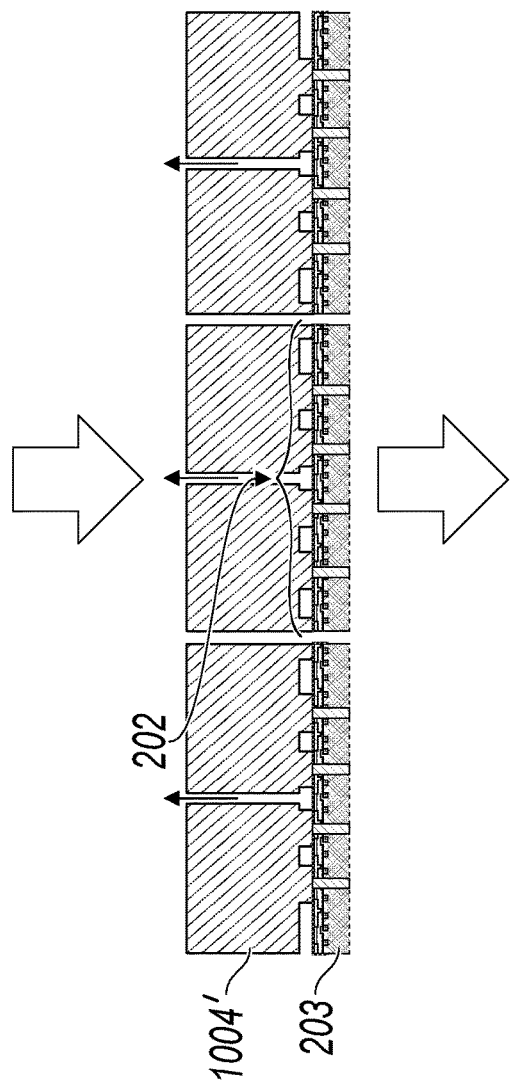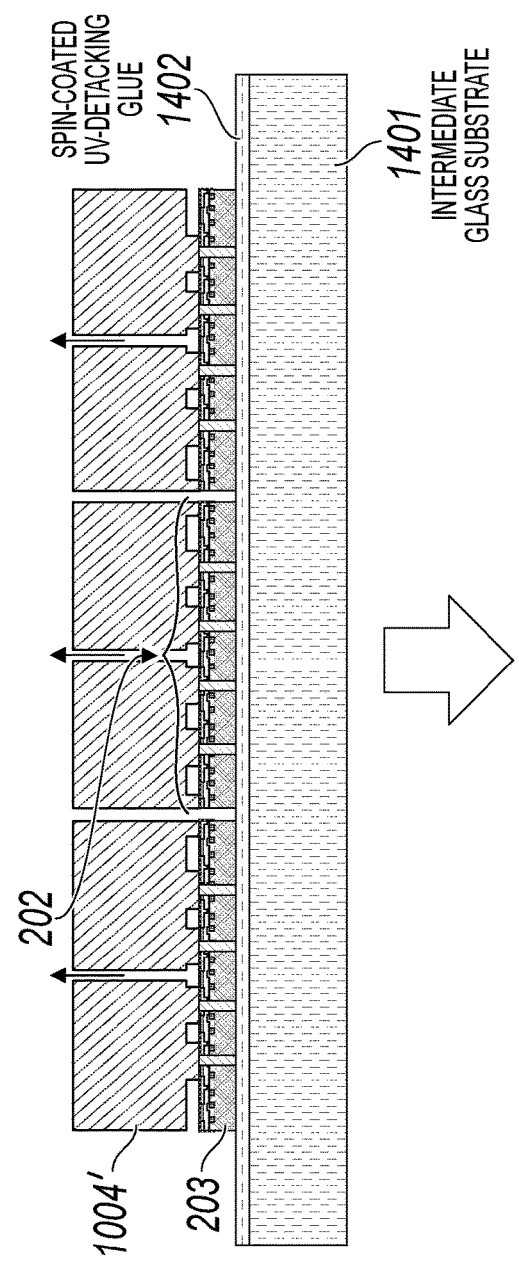

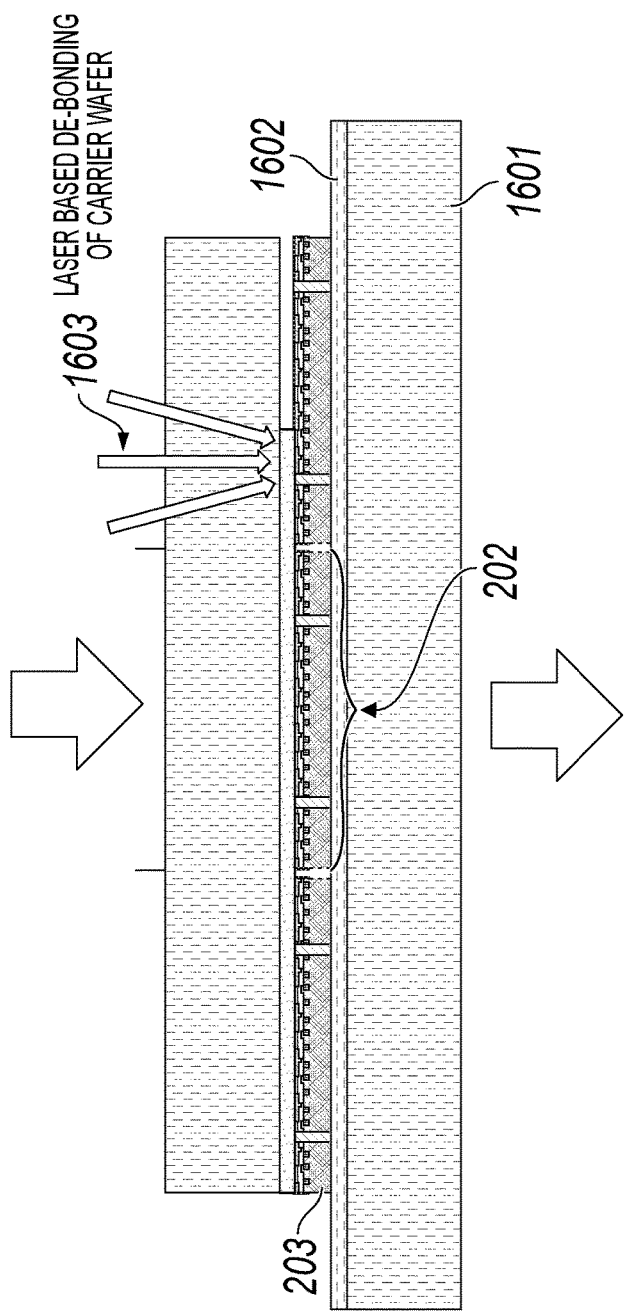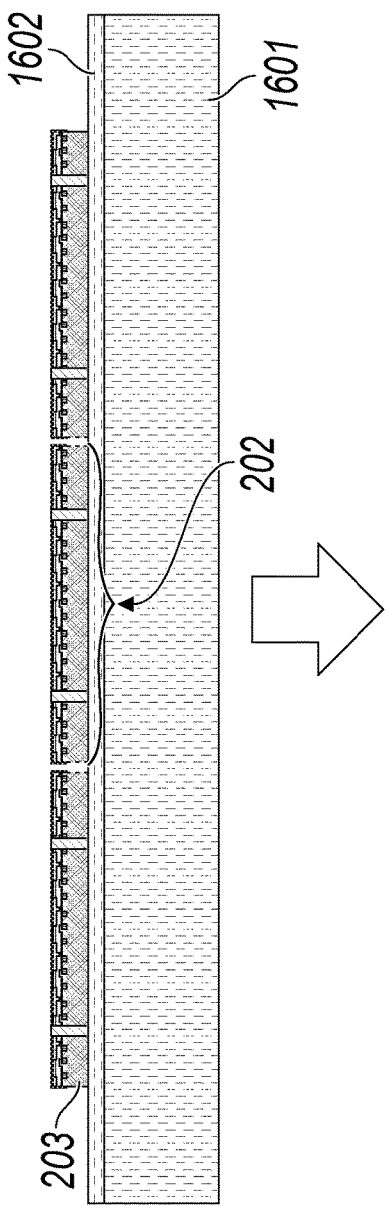

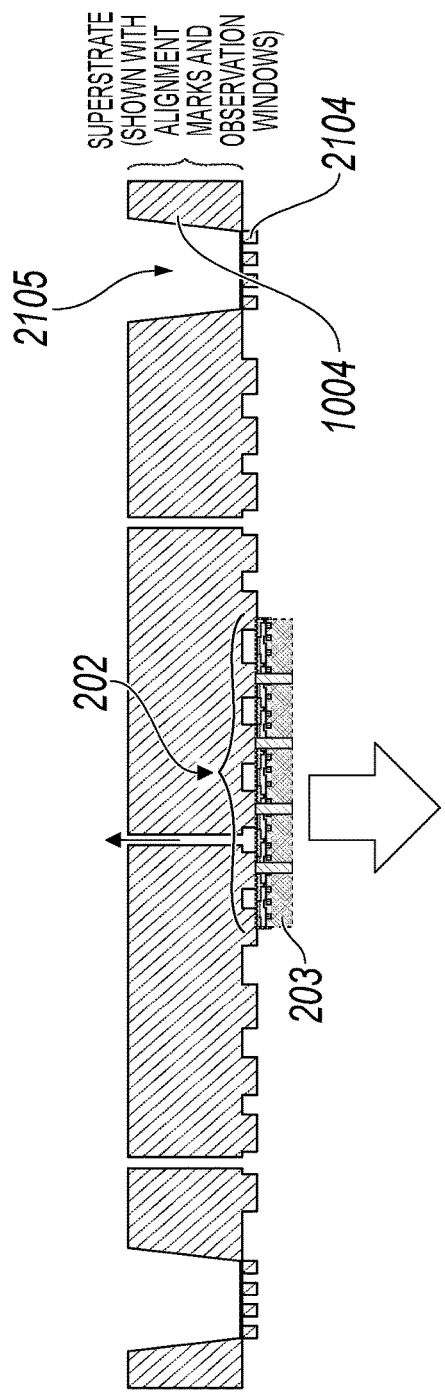
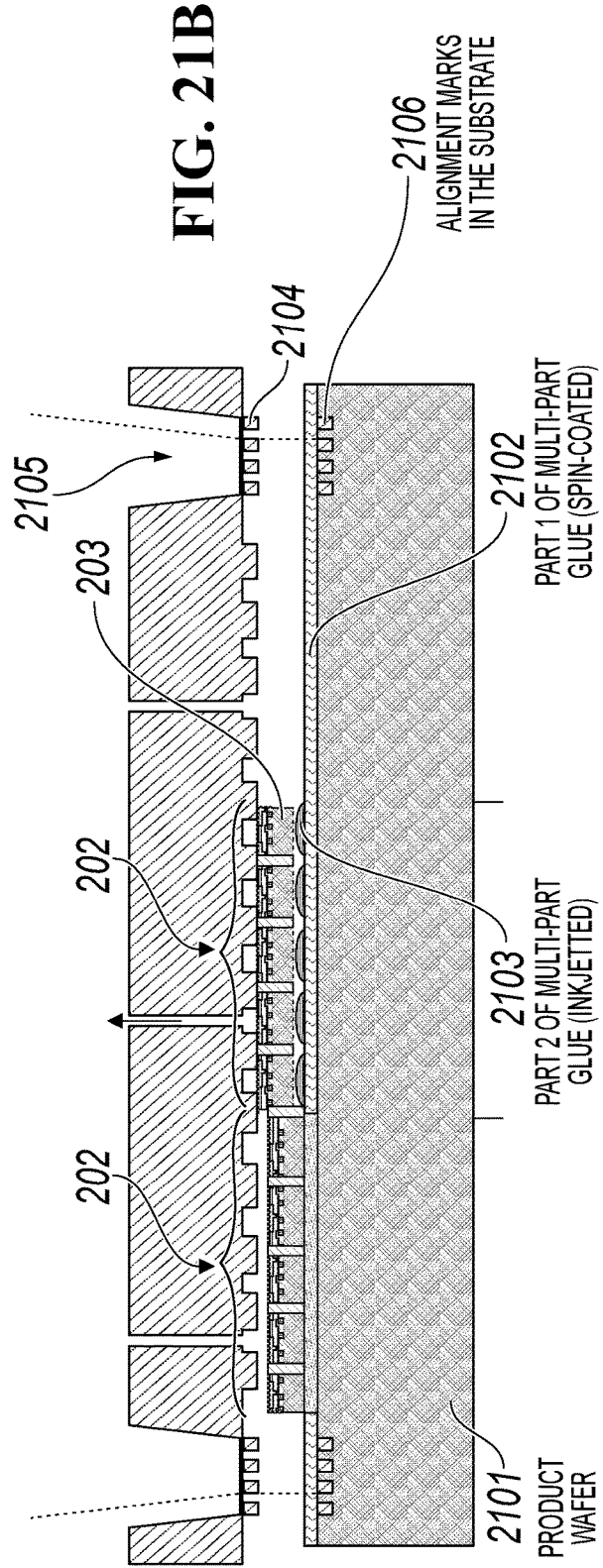
FIG. 21A
FIG. 21B

```
Algorithm 1 Greedy approach based FDG Algorithm
 1: processInputs(ASIC designs data);
 2: scanFloorplansAndgenerateWindows();
 3: analyzeWindows(standard cells placement data);
 4: while (matched_windows ≠ α * total_windows) do
 5:     getReferenceWindow();    ▷ returns max. utilization unmatched window
 6:     for (1...unmatched_windows) do
 7:         similarity = computeSimilarityMetric(window,reference_window);
 8:         if (similarity>threshold_value) then
 9:             groupSimilarWindows(window,reference_window);
10:         else
11:             generateNewWindows(window);    ▷ slide and generate window
12:         end if
13:     end for
14: end while
15: improveFeedstockDesign();  ▷ Greedy approach based cell addition/deletion
     wrt. matching windows
16: if (funccell_mapping == 1) then
17:     for (1....num_feedstocks) do
18:         assignDriveStrengthVTCellMapping(feedstock);
19:     end for
20: end if
21: for (1....num_feedstocks) do
22:     legalizeFeedstockCellsPlacement(feedstock);
23: end for
24: generateReports();                    ▷ generate output feedstock reports
```

FIG. 28

Algorithm 2 Clustering and Graph matching techniques based FDG Algorithm
1: processInputs(ASIC designs data);
2: scanFloorplansAndgenerateOverlappingWindows();
3: analyzeOverlappingWindows(standard cells placement data);
4: generateCriticalCellFactor(timing_report); ▷ generate timing aware weights
5: while ($required\_num\_feedstocks \neq formed\_feedstocks$) do
6:     findReferenceWindow();     ▷ max. critical factor unmapped window
7:     for ($1...unmatched\_windows$) do
8:         similarity = findSimilarityIndex(referene_window,window); ▷ applies min-cost Bi-partite graph matching, logic restructuring, etc.
9:         threshold_value = generateDynamicSimilarityThreshold();
10:         if ($similarity > threshold\_value$) then
11:             groupSimilarWindows(window,feedstock);
12:         end if
13:     end for
14:     threshold_grouping_value = generateSimilarityGroupingThreshold();
15:     if ($total\_grouped\_windows > threshold\_grouping\_value$) then
16:         formInitialFeedstock(groupedWindows);
17:         removeUnmatchedWindows(groupedWindows);
18:         formed_feedstocks ++;
19:     end if
20: end while
21: mapUnmappedWindows(unmappedWindows, all_feedstocks);
22: updateInitialFeedstocks();     ▷ serves as starting points for k-Means algo
23: while ($kmeans\_iteration\_improvement > threshold\_improvement\_value$) do
24:     cost = performKMeansClustering(windows,all_feedstocks); ▷ applies min-cost bipartite matching, k-Means clustering, logic restructuring, etc.
25:     updateFeedstocks();     ▷ update feedstock based on mapped windows, legalize cell placement using median and Abacus algorithm, etc.
26:     kmeans_iteration_improvement = cost(n-1) - cost(n);
27: end while
28: generateReports();     ▷ generate output feedstock reports

FIG. 29

```
Algorithm 3 Greedy approach based FPS Algorithm
 1: processInputs(ASIC design data);
 2: scanFloorplanAndgeneratePartitions();
 3: assignCellsToPartitions();
 4: findCriticalNonCriticalPartitions();
 5: for (1...critical_partitions) do
 6:     feedstockAssignment(all_feedstocks,partition);  ▷ greedy approach based
    feedstock mapping
 7: end for
 8: for (1...noncritical_partitions) do
 9:     feedstockAssignment(all_feedstocks,partition);  ▷ greedy approach based
    feedstock mapping
10: end for
11: groupFormationAndMapping();         ▷ group nearby windows and map
    unmatched cells to spare cells placed in group
12: unmatchedCellsMapping();        ▷ Map unmatched cells with spare cells in
    design
13: for (1....placed_feedstocks) do
14:     legalizeFeedstockPlacement(feedstock);
15: end for
16: generateReports();         ▷ generate output feedstock placement reports
```

FIG. 30

Algorithm 4 Graph matching techniques based FPS Algorithm
1: processInputs(ASIC design data);
2: scanFloorplanAndgeneratePartitions();
3: assignCellsToPartitions();
4: generateCriticalCellsFactor(timing_report);  ▷ timing aware cell/window critical factor
5: for (1...*all_partitions*) do
6:     mapFeedstock(all_feedstocks,partition);  ▷ applies min-cost Bi-partite graph matching, timing aware net weighting, logic restructuring, etc.
7: end for
8: mapUnmappedCellsToSpareCells(all_feedstocks,unmapped_cells);  ▷ applies min-cost Bi-partite graph matching, timing aware net weighting, logic restructuring, etc.
9: partialSynthesis(mapped_cells);
10: for (1....*placed_feedstocks*) do
11:     legalizeFeedstockPlacement(feedstock);
12: end for
13: generateReports();  ▷ generate output feedstock placement reports

FIG. 31

```
Algorithm 5 Post-Mask Clock Tree Synthesis Algorithm
 1: deleteCells(spare_CTS_cells);
 2: createDesiredRegionsStripes();
 3: setupCTSEnvironment();
 4: performCTS();                    ▷ performs CTS in Cadence Innovus tool
 5: processInputs(CTS_added_cells,spare_CTS_cells);
 6: for (1...CTS_added_cells) do
 7:     mapCTSCellToSpareCell();     ▷ applies either greedy approach based
    mapping or min-cost bipartite graph matching techniques, etc.
 8:     if (cell_map == 1) then
 9:         swap_cell ← CTS_added_cell;
10:         delete(CTS_added_cell);
11:         swapNetlistPinAndCellConnections();
12:     end if
13: end for
14: for (1...existing_CTS_added_cells) do
15:     delete(CTS_added_cell);
16:     preserveNetlistLogic();
17:     changeNetlistConnections();
18: end for
19: generateTclCommandFile();  ▷ contains cell/pin add/del/swap commands
20: source < TCL_FILE >    ▷ source it in Innovus session loaded with CTS
    database to perform postMask CTS
```

FIG. 32

Algorithm 6 Post-Mask Post-CTS/Post-Route Buffer Insertion Algorithm
1: analyzeTimingReports();
2: sortDataPathsSlacks();
3: sortClockPathsInsDelaySkew();
4: if ($dataPathOptimizations == 1$) then
5:     findViolatingPathCells();
6:     findPositiveSlackPathCells();
7:     fixDataPathViolations(spare_buffers,positive_slack_path_buffers); ▷ applies either greedy approach based mapping or min-cost bi-partite graph matching techniques, etc.
8: end if
9: if ($clockPathOptimizations == 1$) then
10:     findSkewInsDelayPathCells();
11:     findBalancedClockTreeBranchCells();
12:     fixClockPathViolations(spare_CTS_buffers,balanced_branch_CTS_cells); ▷ applies either greedy approach based mapping or min-cost bi-partite graph matching techniques, etc.
13: end if
14: generateTclCommandFile();
15: source $< TCL\_FILE >$   ▷ source in Innovus session to resolve violations

FIG. 33

existing commercial EDA solutions, where the existing commercial EDA solutions are used to perform post-Mask ECO synthesis, and/or pre-CTS, and/or CTS, and/or route, and/or signoff analysis flows.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

HETEROGENEOUS INTEGRATION OF COMPONENTS ONTO COMPACT DEVICES USING MOIRE BASED METROLOGY AND VACUUM BASED PICK-AND-PLACE

CROSS REFERENCE TO RELATED APPLICATIONS

This application claims priority to U.S. Provisional Patent Application Ser. No. 62/438,952, entitled "Highly Parallel Nano-Precise Pick and Place Methods for Micro-Scale Feedstock," filed on Dec. 23, 2016, which is incorporated by reference herein in its entirety.

TECHNICAL FIELD

The present invention relates generally to heterogeneous integration of components (e.g., electronics, photonic and energy storage devices), and more particularly to the heterogeneous integration of components onto compact devices using more based metrology and vacuum based pick-and-place.

BACKGROUND

Cutting-edge consumer and industrial applications are driving the need for devices with a variety of integrated yet disparate functional elements. Depending on the specific application, these elements could be electronics, optics, photonics, fluidics, nano-mechanical elements and even biological systems-on-chip. These would be ideally integrated on a semiconductor substrate, such as silicon, since they can then be packaged using standard semiconductor packaging technology and further integrated into a larger device.

Semiconductor fabrication, as it stands currently, is not suited for heterogeneous integration. It is impractical to process the sheer variety of incompatible fabrication steps on a single semiconductor substrate. Pick-and-place is a natural solution for heterogeneous integration in short time scales. Many techniques have previously demonstrated this for micrometer sized components, but none have the combined features of highly parallel pick-and-place, arbitrary constituent distribution, and nanometer-precise placement.

SUMMARY

In one embodiment of the present invention, a method for assembling heterogeneous components comprises assembling a subset of elements with a distribution selectively picked from a source wafer using pick-and-place. The method further comprises placing the selectively picked subset of elements onto a product wafer.

In another embodiment of the present invention, a feedstock, where the feedstock varies in size from sub-10 μm on a side to over 1 millimeter on a side, and where the feedstock is used to design a base-layer portion of an application specific integrated circuit (ASIC) system on a chip (SoC).

In another embodiment of the present invention, an application specific integrated circuit (ASIC) system on a chip (SoC) is designed and manufactured using feedstocks that are selectively picked from source wafers and assembled onto a product wafer.

In a further embodiment of the present invention, an electronic design automation (EDA) methodology for designing feedstock configured ASIC SoCs comprises a combination of in-house developed software integrated with existing commercial EDA solutions, where the existing commercial EDA solutions are used to perform post-Mask ECO synthesis, and/or pre-CTS, and/or CTS, and/or route, and/or signoff analysis flows.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIGS. 14A-14E depict the cross-sectional views for picking up an element using the steps described in FIG. 13 in accordance with an embodiment of the present invention;

FIGS. 16A-16E depict the cross-sectional views for picking up an element using the steps described in FIG. 15 in accordance with an embodiment of the present invention;

FIGS. 21A-21C depict the cross-sectional views for aligning, placing and bonding elements using the steps described in FIG. 20 in accordance with an embodiment of the present invention;

FIG. 28 illustrates Algorithm 1 that implements the greedy mapping approach based feedstock generation in accordance with an embodiment of the present invention;

FIG. 29 illustrates Algorithm 2 that implements the feedstock design generation using optimal graph matching techniques and k-Means clustering in accordance with an embodiment of the present invention;

FIG. 30 illustrates Algorithm 3 that implements the greedy mapping approach based feedstock placement and selection in accordance with an embodiment of the present invention;

FIG. 31 illustrates Algorithm 4 that implements the optimal graph matching based feedstock selection and placement in accordance with an embodiment of the present invention;

FIG. 32 illustrates Algorithm 5 that presents the post-Mask clock tree synthesis algorithm in accordance with an embodiment of the present invention;

FIG. 33 illustrates Algorithm 6 which implements the post-Mask post-CT S, post-Route buffer insertion in accordance with an embodiment of the present invention;

DETAILED DESCRIPTION

Figure 1:
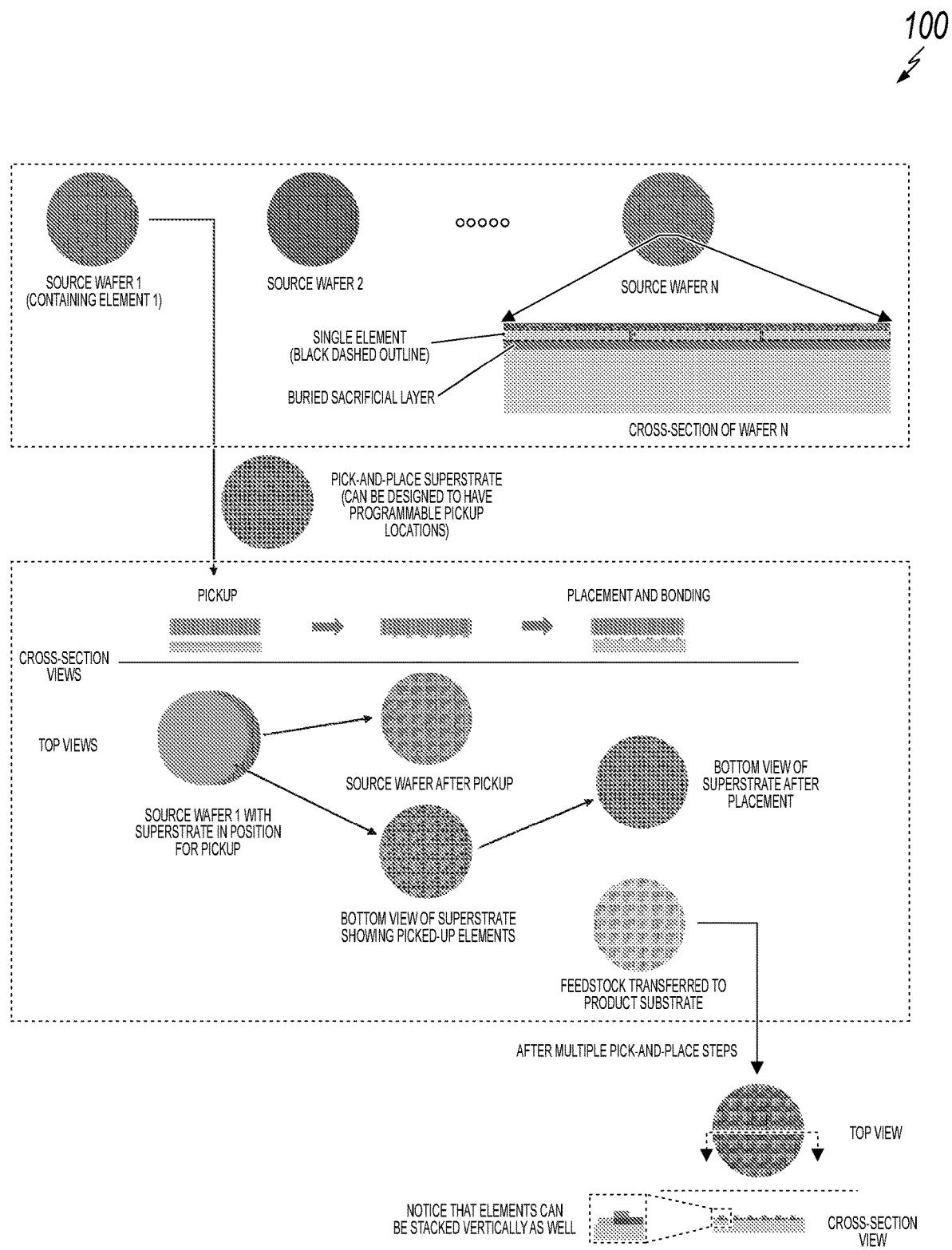
FIG. 1 illustrates a representation of the assembly process in accordance with an embodiment of the present invention.

As stated in the Background section, cutting-edge consumer and industrial applications are driving the need for devices with a variety of integrated yet disparate functional elements. Depending on the specific application, these elements could be electronics, optics, photonics, fluidics, nanomechanical elements and even biological systems-on-chip. Semiconductor fabrication, as it stands currently, is not suited for heterogeneous integration. It is impractical to process the sheer variety of incompatible fabrication steps on a single semiconductor substrate. Pick-and-place is a natural solution for heterogeneous integration in short time scales. Many techniques have previously demonstrated this for micrometer sized components, but none have the combined features of highly parallel pick-and-place, arbitrary constituent distribution, and nanometer-precise placement.

The present invention relates generally to the heterogeneous integration of varied components, such as electronics, photonic and energy storage devices, which is desirable for many consumer, medical and scientific applications. Pick-and-place based methods are ideally suited for such applications as the individual components can be separately manufactured and later assembled onto a product substrate. Current pick-and-place techniques, however, cannot assemble with nanoscale precision. The present invention presents a novel technique which can achieve sub-100 nm and in some embodiments sub-25 nm or even sub-10 nm alignment in assembly, using more based metrology and vacuum based pick-and-place.

The present invention provides a set of assembly processes with the ability to assemble elements as small as tens of micrometers to many millimeters across and/or perform highly parallel assembly ($10^2$ to $10^6$ elements per step) and/or assemble with a placement precision significantly smaller than 100 nm, and approaching as small as 10 nm ($3\sigma$ alignment error) or 5 nm ($3\sigma$ alignment error).

In one embodiment of the present invention, the present invention provides parallel nanometer-precise deterministic assembly. In one embodiment, disparate functional elements which have been fabricated on Semiconductor-on-Insulator wafers including Silicon-on-Insulator (SOI) wafers are picked up, and then placed (and securely attach) onto a target substrate with nanometer scale precision. The term functional element (or simply element) here denotes the smallest physical unit used for pick-and-place. Such an element could quite possibly contain an ensemble of sub-elements. For instance, a 1 mm×1 mm photonic element could contain both photonic sub-elements and certain specialized electronics inside of it. In one embodiment, the semiconductor includes substrates composed of Si, Ge, SiGe, GaAs, InP, etc. The fabrication of devices on such wafers is well established and the buried oxide (BOx) layer allows a way to selectively transfer elements from specific locations. Many different types of functional elements could be integrated, such as transistors, optical devices and MEMS, each having been fabricated on a separate wafer.

In one embodiment, a generally applicable assembly sequence is as follows—

1. Etch and encapsulation
2. Bulk-etch processes (to facilitate subsequent pick-and-place)
3. Element pickup
4. Alignment of element(s) to product substrate and temporary attachment
5. Bonding
6. Repeat 3-5 until product wafer is fully assembled These are described in greater detail further below.

A simplified sequence of steps is shown in FIG. 1. FIG. 1 illustrates a representation of the assembly process in accordance with an embodiment of the present invention.

The overall assembly process leverages the sub-5 nm alignment capability of more based schemes to achieve parallel nanometer-precise deterministic assembly. A further discussion regarding the overall assembly process is provided in Euclid E. Moon, "Interferometric-Spatial-Phase Imaging for sub-Nanometer Three-Dimensional Positioning," Massachusetts Institute of Technology, 2004, which is hereby incorporated by reference in its entirety.

Before source wafers are ready for pick-and-place, they need to go through a few preprocessing steps. For instance, to protect sensitive components from chemical damage, an encapsulation layer is needed. Additionally, prior to pick-and-place, holes might need to be etched to access the buried sacrificial layer.

Figure 2:
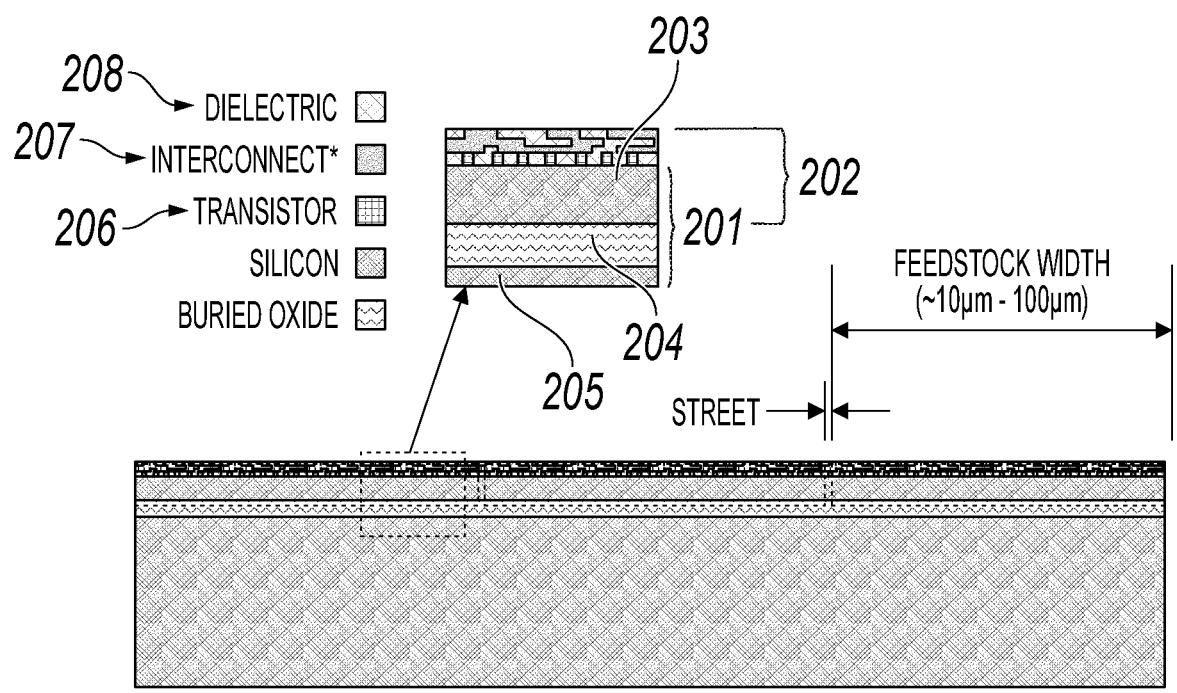
FIG. 2 illustrates a silicon-on-insulator (SOI) wafer with three elements in accordance with an embodiment of the present invention.

Referring now to FIG. 2, FIG. 2 illustrates a silicon-on-insulator (SOI) wafer 201 with three elements 202 in accordance with an embodiment of the present invention. SOI wafer 201 consists of a layered silicon 203—insulator (sacrificial layer) 204—silicon 205 substrate. In one embodiment, element 202 is a "feedstock," which in its most general form, consists of layers of transistors 206, interconnects 207 and dielectrics 208. Furthermore, element 202, as used herein, includes silicon layer 203 of SOI wafer 201. It may or may not have any functionality in itself, but when assembled together with other elements 202 and possibly additional interconnect and dielectric layers 207, 208 could be used to fabricate a working ASIC. Additionally, frontend high-resolution device layers, for which mask cost is high, would reside inside element 202. This is to amortize the cost of expensive masks (for the high-resolution device layers) across the fabrication of a variety of ASIC devices.

In one embodiment, element 202 can vary in size from ~10 μm on a side to above~100 μm. In another embodiment, element 202 can vary in size from ~sub-1 μm on a side to above~100 μm. The size of all constituent elements 202 may or may not be the same across one ASIC design.

The assembly technique discussed above may need to be modified to accommodate the specific demands of ASIC fabrication. The modified process and mechanical design concepts follow these general guidelines: (1) precision of assembly (sub-100 nm 3σ) is of primary importance; (2) time of assembly is important (but less important than precision of assembly); and (3) processes which might produce particles need to be avoided.

The overall assembly process, starting from element wafers ending in the product wafer, can be divided into the following sequence of steps: (1) preprocessing of element wafers (element etch and encapsulation); (2) bulk-etch processes (to facilitate subsequent pick-and-place); (3) element pickup; (4) alignment of element to product substrate; (5) element placement and bonding; and (6) repeat 3-5 until product wafer is fully assembled.

In one embodiment, two preprocessing steps may need to be performed before the elements are ready for pick-and-place: (1) element wafers obtained from a fab have continuous transistor, metal and dielectric layers, where element boundaries and buried oxide (BOx) access holes need to be etched; and (2) exposed device layers need to be encapsulated to make them etchant proof.

Figure 3:
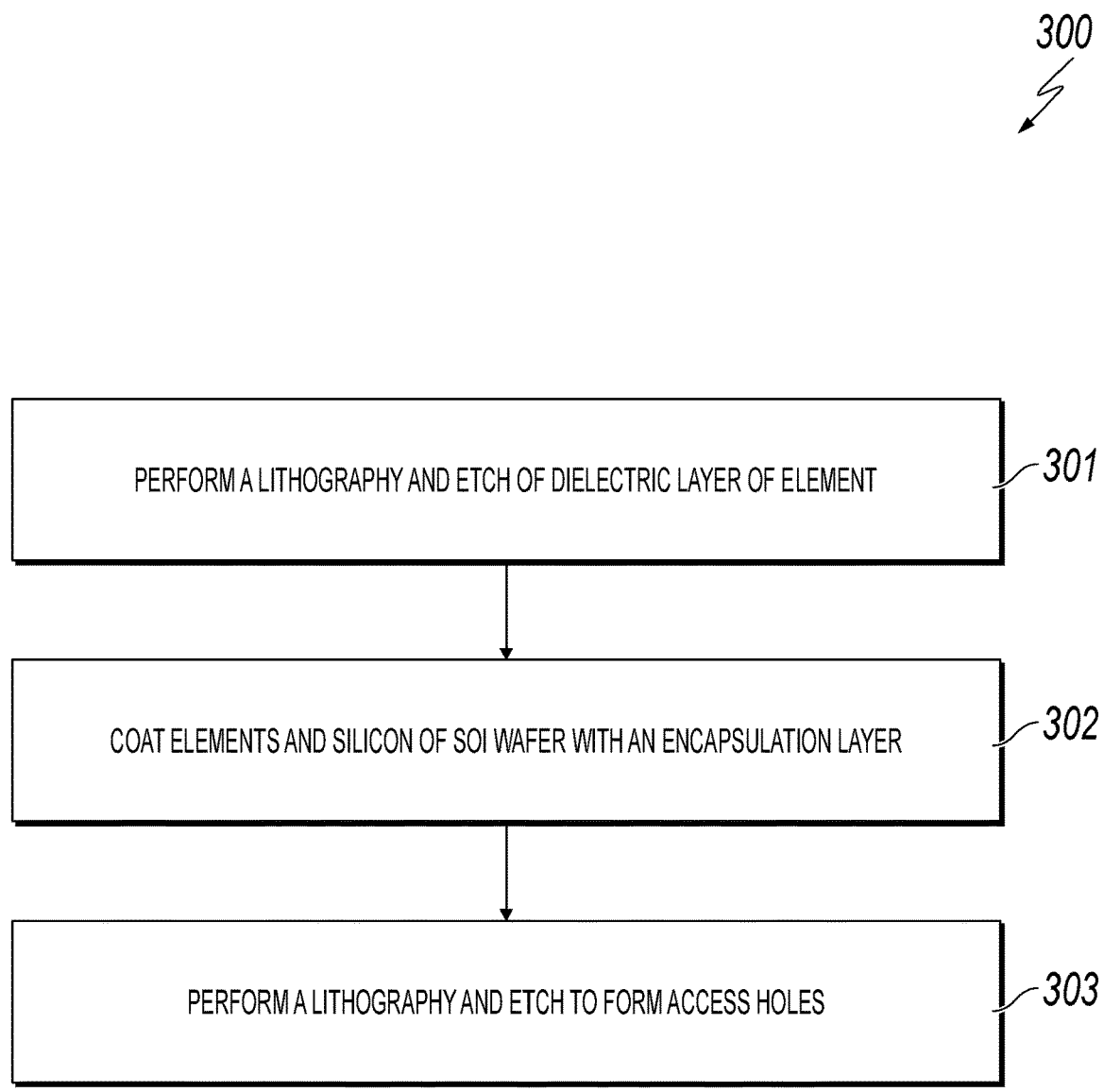
FIG. 3 is a flowchart of a method for performing etch and encapsulation in accordance with an embodiment of the present invention.

Referring now to FIG. 3, FIG. 3 is a flowchart of a method 300 for performing etch and encapsulation in accordance with an embodiment of the present invention. FIGS. 4A-4E depict the cross-sectional views of performing etch and encapsulation using the steps described in FIG. 3 in accordance with an embodiment of the present invention.

Figure 4A:
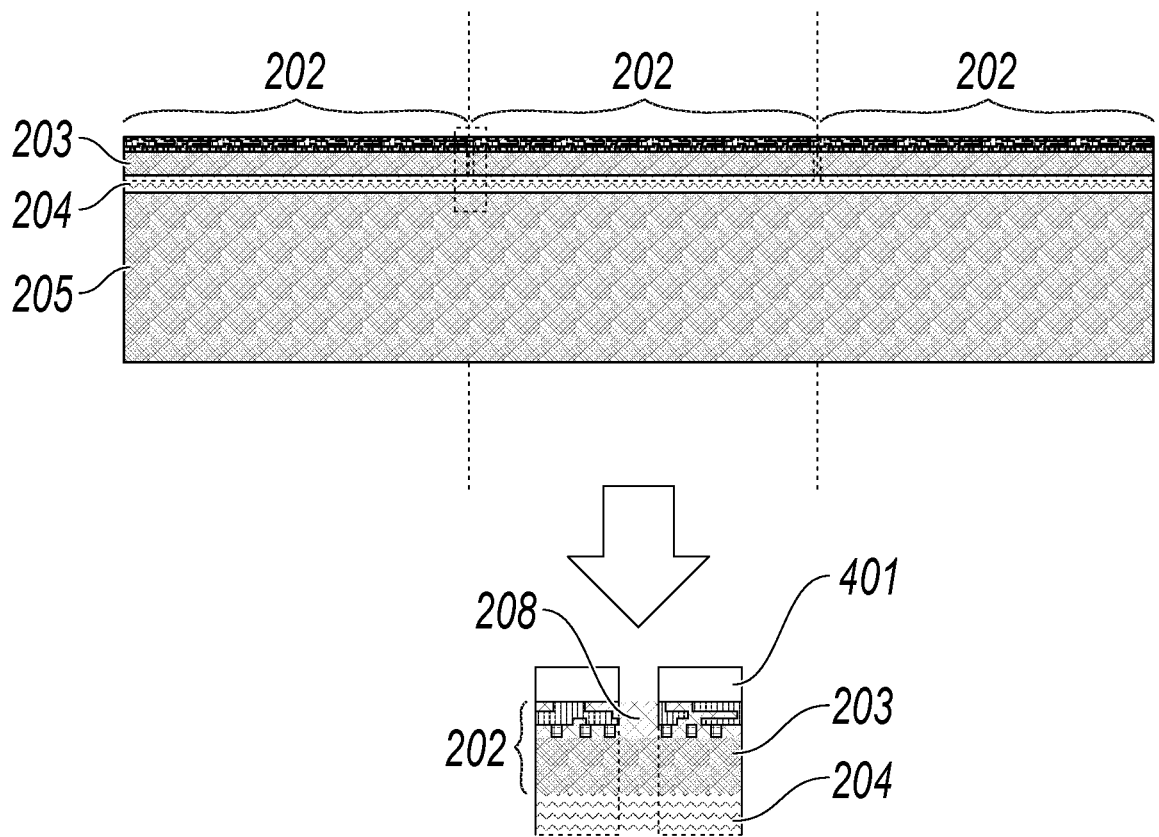
FIGS. 4A-4E depict the cross-sectional views of performing etch and encapsulation using the steps described in FIG. 3 in accordance with an embodiment of the present invention.
Figure 4B:
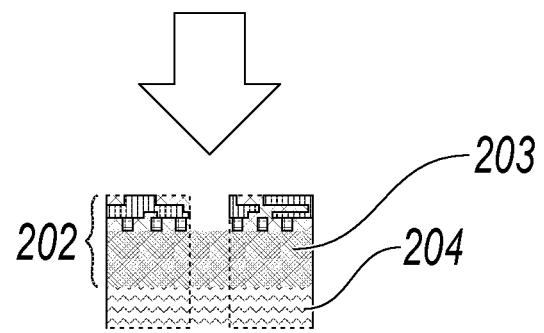

Referring now to FIG. 3, in conjunction with FIGS. 4A-4E, in step 301, a lithography and etch of the dielectric layer 208 of element 202 is performed as shown in FIGS. 4A-4B. In one embodiment, a masking material 401 is used to prevent etching of certain portions of element 202 as shown in FIGS. 4A-4B.

Figure 4C:
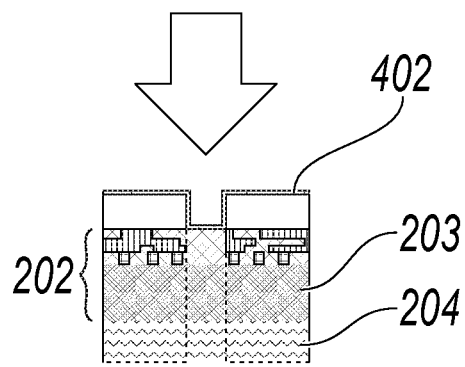

In step 302, elements 202 and silicon 203 of SOI wafer are coated with an encapsulation layer 402 as shown in FIG. 4C.

Figure 4D:
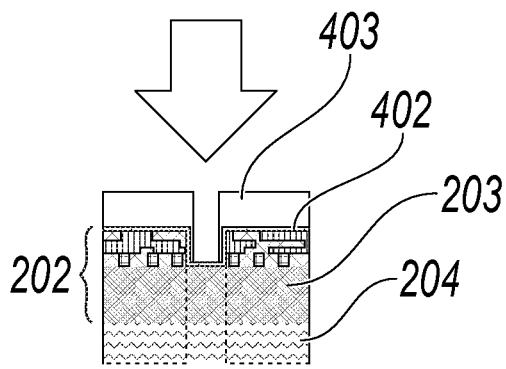
Figure 4E:
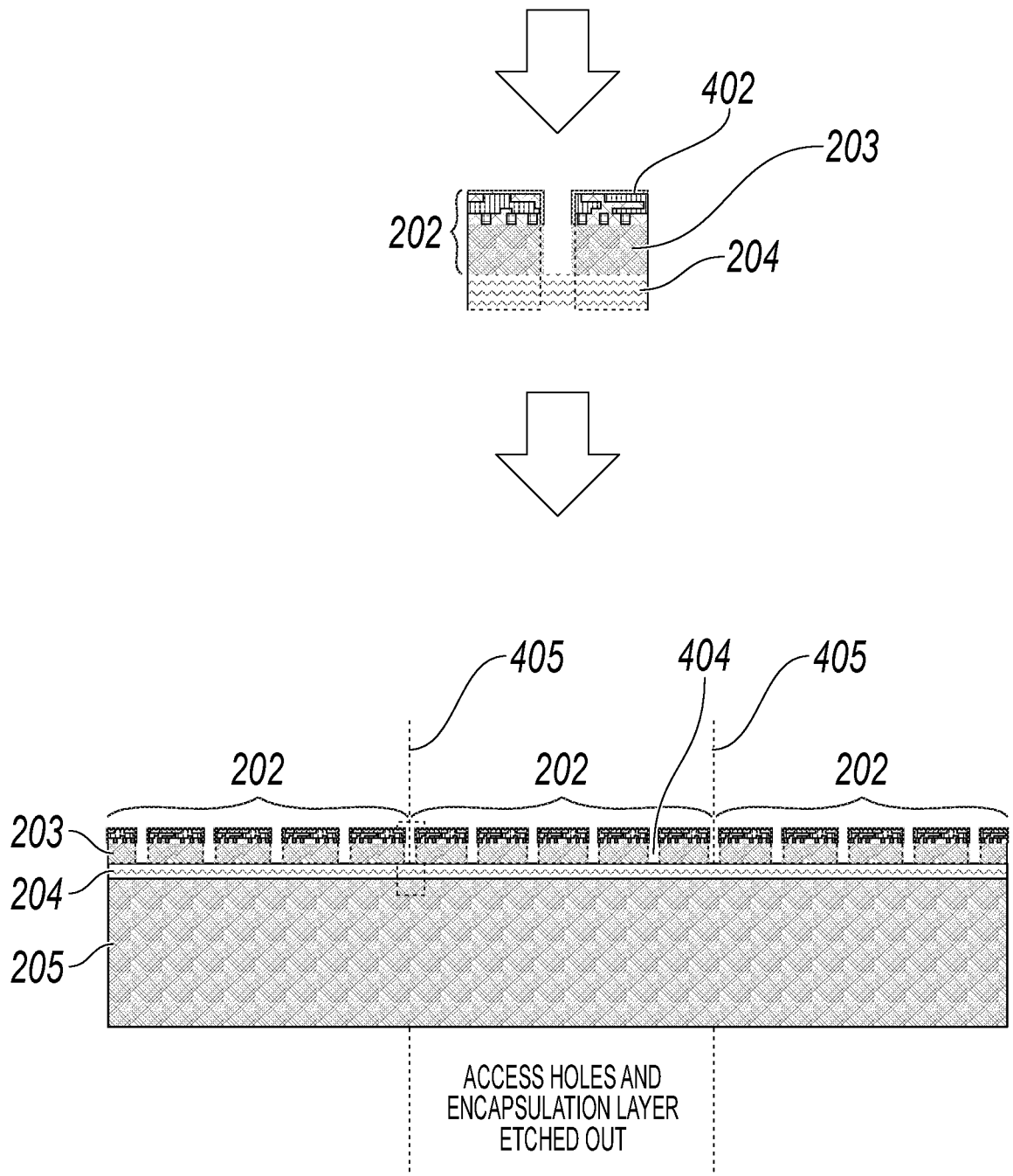

In step 303, a lithography and etch of the structure of FIG. 4C is performed to form access holes (e.g., BOx access holes) as shown in FIGS. 4D and 4E. In one embodiment, a masking material 403 is used to prevent etching of elements 202. As shown in FIG. 4E, access holes 404 (e.g., Box access holes) are formed.

A further discussion regarding method 300 is provided below.

It is noted that the processed wafer in FIGS. 4A-4E has both element boundaries 405 (see FIG. 4E) and access holes 404 to the buried sacrificial layer etched out. While the element boundary etch is necessary to separate individual elements 202, the access hole etch may or may not be necessary depending on subsequent processes.

In general, encapsulation layer 402 needs to be resistant to etchants (specifically HF), should not shed particles and needs to be semiconductor grade. Additionally, encapsulation layer 402 could also serve to absorb and limit mechanical scratching damage to the encapsulated elements. Two materials which could potentially be used are aluminum oxide ($Al_2O_3$) and amorphous carbon. $Al_2O_3$ is known to be HF resistant and can be deposited using common vacuum deposition processes, such as atomic layer deposition (ALD) and chemical vapor deposition (CVD). Additionally, it has been widely used as a high-K capping layer in CMOS. Amorphous carbon is substantially HF resistant and there are known semiconductor grade chemical vapor deposition (CVD) processes for it. Amorphous carbon is mainly used as a hardmask in multiple pattering. Hardmask materials need to be resistant to plasma etch chemistries which include fluorine radicals among others. A discussion regarding etch stop materials for release by vapor HF etching is provided in Bakke et al., "Etch Stop Materials for Release by Vapor HF Etching," 16 MicroMechanics Europe Workshop, Göteborg, Sweden, 2005, which is hereby incorporated by reference in its entirety.

In one embodiment, the access hole width is slightly smaller than the boundary trench. This is to ensure that encapsulation layer 402 is not etched off at the sidewalls during the access hole etch.

Chemical etching is a fairly slow process. For instance, vapor HF based etching of sacrificial oxide in SOI wafers occurs at a rate of about 60 nm/min at room temperature and a few micrometers/minute at elevated temperatures. At this rate, etching through millimeters of underlying oxide might take many hours. To help improve overall assembly throughput, a bulk-etch is done to partially strip the underlying sacrificial layer. Even though individual wafers might take a long time to etch, by processing a large number of wafers in a single batch the overall throughput can be kept high.

A variety of possible bulk-etch sequences are now described.

In one embodiment, one such concept is to reduce the extent of the sacrificial layer by etching from the underside of the wafer.

Figure 5:
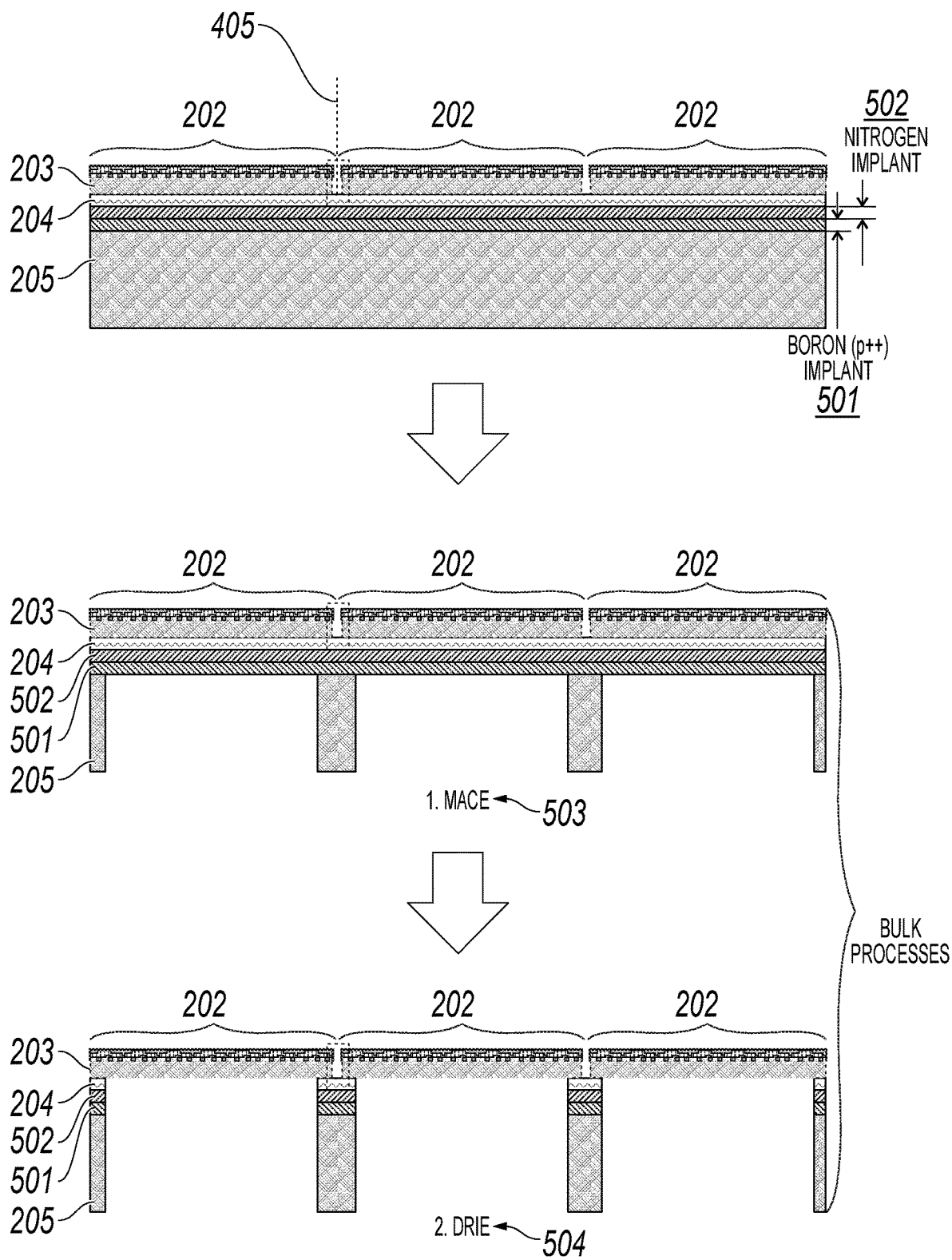
FIG. 5 illustrates a process for reducing the extent of the sacrificial layer by etching from the underside of the wafer in accordance with an embodiment of the present invention.

FIG. 5 illustrates a process for reducing the extent of the sacrificial layer by etching from the underside of the wafer in accordance with an embodiment of the present invention. One starts with a source wafer which has boron and nitrogen layers 501, 502 implanted underneath sacrificial layer 204. Boron acts as an etch stop for the subsequent MACE process

503. Nitrogen acts as a barrier to prevent boron from diffusing into the device layers.

Metal assisted chemical etching (MACE) 503 can now be done to etch through the bulk silicon from the underside of the wafer.

The implant and sacrificial layers can be etched using an anisotropic etch technique, such as DRIE 504.

The width of the etched holes is smaller than the element width. This leaves the elements attached to the bulk silicon using a thin mesh of oxide which is easy to selectively remove during the pick-and-place step.

Alternatively, in one embodiment, multiple smaller through-holes are etched as opposed to one large hole per element. Multiple smaller through-holes, if present, would serve to provide greater mechanical stability.

In one embodiment, a second concept is to reduce the extent of the sacrificial layer by etching from the top, instead of boring through the underside of the wafer. Etching hundreds of micrometers of silicon can be an extremely slow process even when done in bulk. To resolve this, individual elements are modified to have access holes to the buried sacrificial layer. These provide access to the sacrificial layer from the top of the source wafer, effectively shortening the etch distance. The placement and geometry of these holes can be modified depending on the size of the functional element, etch rate needed and the throughput requirement. The access holes additionally lead to multiple pillar-like arrangements in the sacrificial layer post-etch, which provide better mechanical support to an element.

Figure 6:
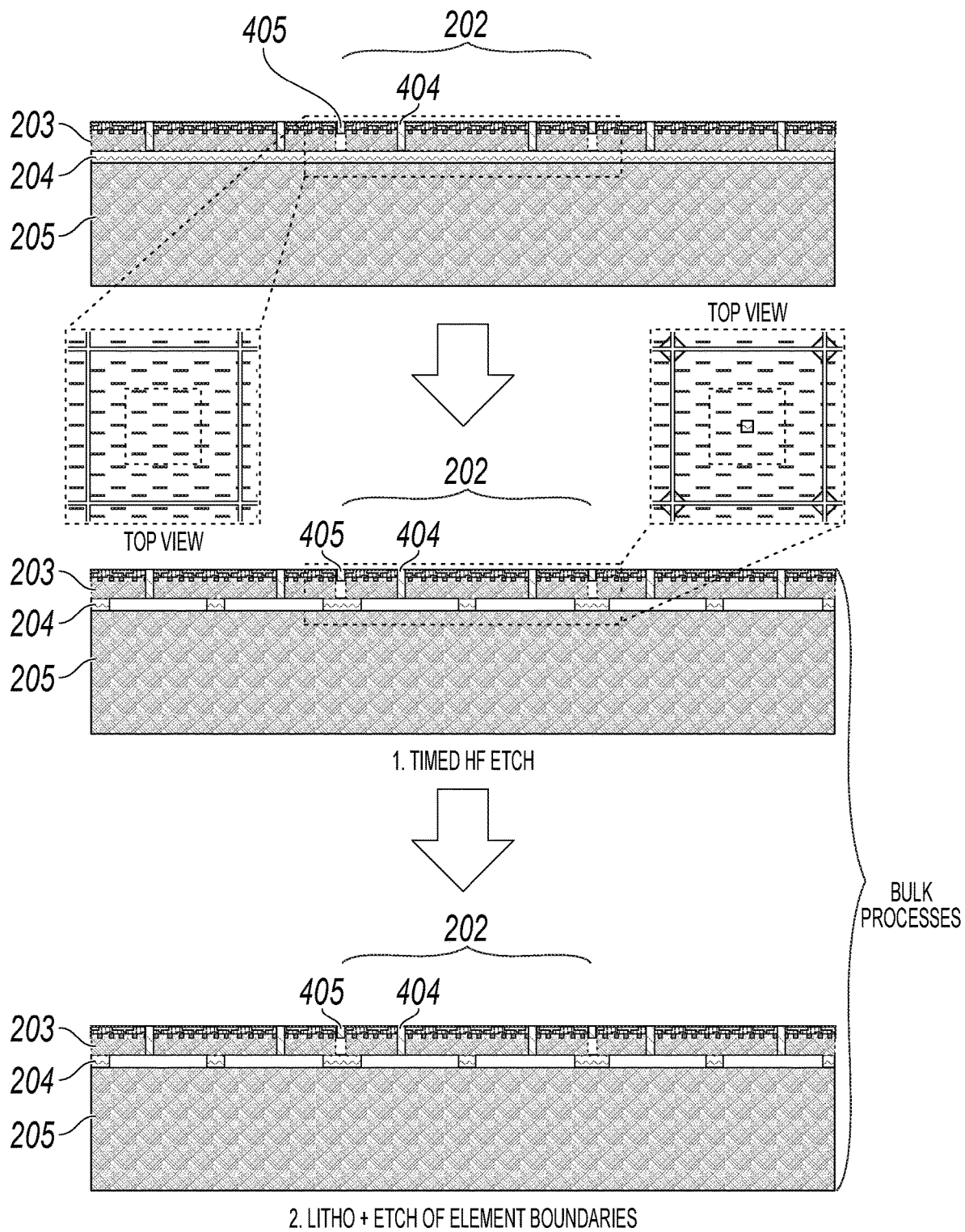
FIG. 6 illustrates a process for reducing the extent of the sacrificial layer by etching from the top of the wafer in accordance with an embodiment of the present invention.

FIG. 6 illustrates a process for reducing the extent of the sacrificial layer by etching from the top of the wafer in accordance with an embodiment of the present invention. In one embodiment, one starts with an encapsulated source wafer, with element boundaries 405 as well as access holes 404 already etched. The access hole arrangement shown in FIG. 6 is exemplary. Other arrangement could be used as well. Notice that while access holes 404 are etched all the way through, element boundaries 405 are not. This is to prevent the etching of the sacrificial layer at the boundaries. The boundary oxide will be used as a seal to prevent etchants from leaking to an adjacent element 202 during the pick-and-place step.

The sacrificial layer 204 can now be etched using an etchant, such as vapor HF (vHF). vHF is a commonly used etchant for BOx etching in MEMS applications. It is preferred because both the reactants (HF) and products are in vapor phase, which resolves many issues with liquid etchants, such as stiction. The etch is timed so that pillar-like structures remain underneath the element post-etch.

Finally, element boundaries 405 can be etched using standard lithography and etch techniques.

Figure 7:
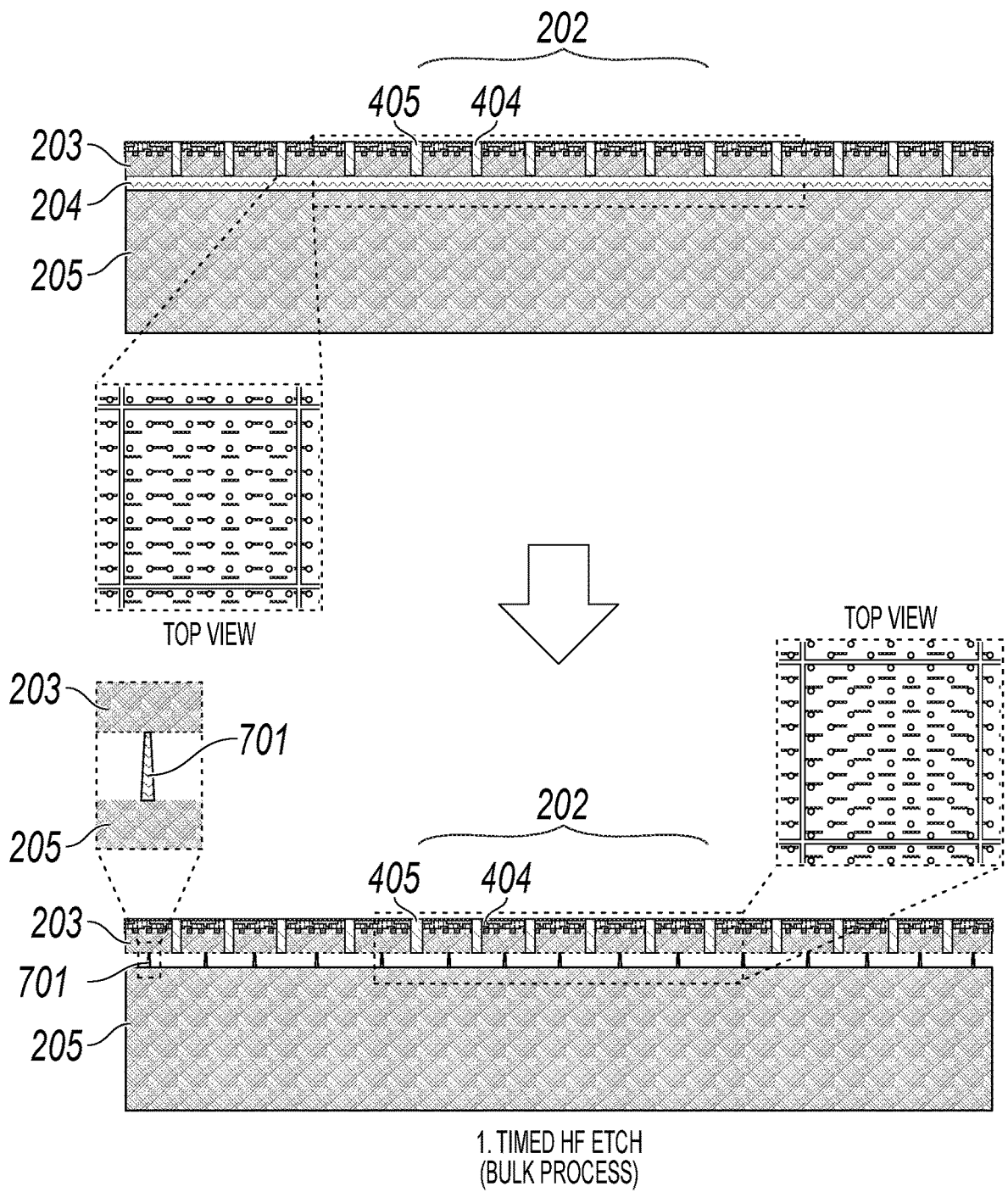
FIG. 7 illustrates a process for reducing the extent of the sacrificial layer by etching from the top of the wafer while doping the sacrificial layer in accordance with an embodiment of the present invention.

In another embodiment, a third concept (similar to the second concept) is to reduce the extent of the sacrificial layer by etching from the top of the wafer while doping the underlying oxide as shown in FIG. 7. FIG. 7 illustrates a process for reducing the extent of the sacrificial layer by etching from the top while doping the sacrificial layer in accordance with an embodiment of the present invention.

The third concept is similar to the second concept in that oxide etching is performed from the top and access holes 404 are used to speed up the etching process. The difference between the second and third concepts is that the underlying oxide is doped, and the doping profile is such that maximum dopant concentration occurs at the top of the sacrificial layer 204 and drops to a minimum at the bottom. Such a doping profile leads to corresponding variation in the etch rate across the depth of sacrificial layer 204, which subsequently leads to the formation of pyramidal pillars (tethers) 701. These pyramidal tethers 701, as will be discussed later, can facilitate the pick-and place step.

Wafer back-grinding is a widely used technique in wafer packing and 3D integration. In one embodiment, wafer-back grinding can be used to supplement the various bulk-etch processes.

For example, in the first concept discussed above to reduce the extent of the sacrificial layer by etching the underside of the wafer, the depth of MACE required could be reduced using a wafer back-grinding process.

Alternatively, as a way to speed-up the HF etches in the second and third concepts discussed above, the wafer could be thinned all the way to the sacrificial layer (see FIGS. 8 and 9A-9C). Since a larger area of the oxide is now exposed, the etch time for a subsequent HF etch would be much lower than the second and third concepts. This would ideally serve as an alternative to the pick-and-place process of concept FP-3 (discussed below).

Figure 8:
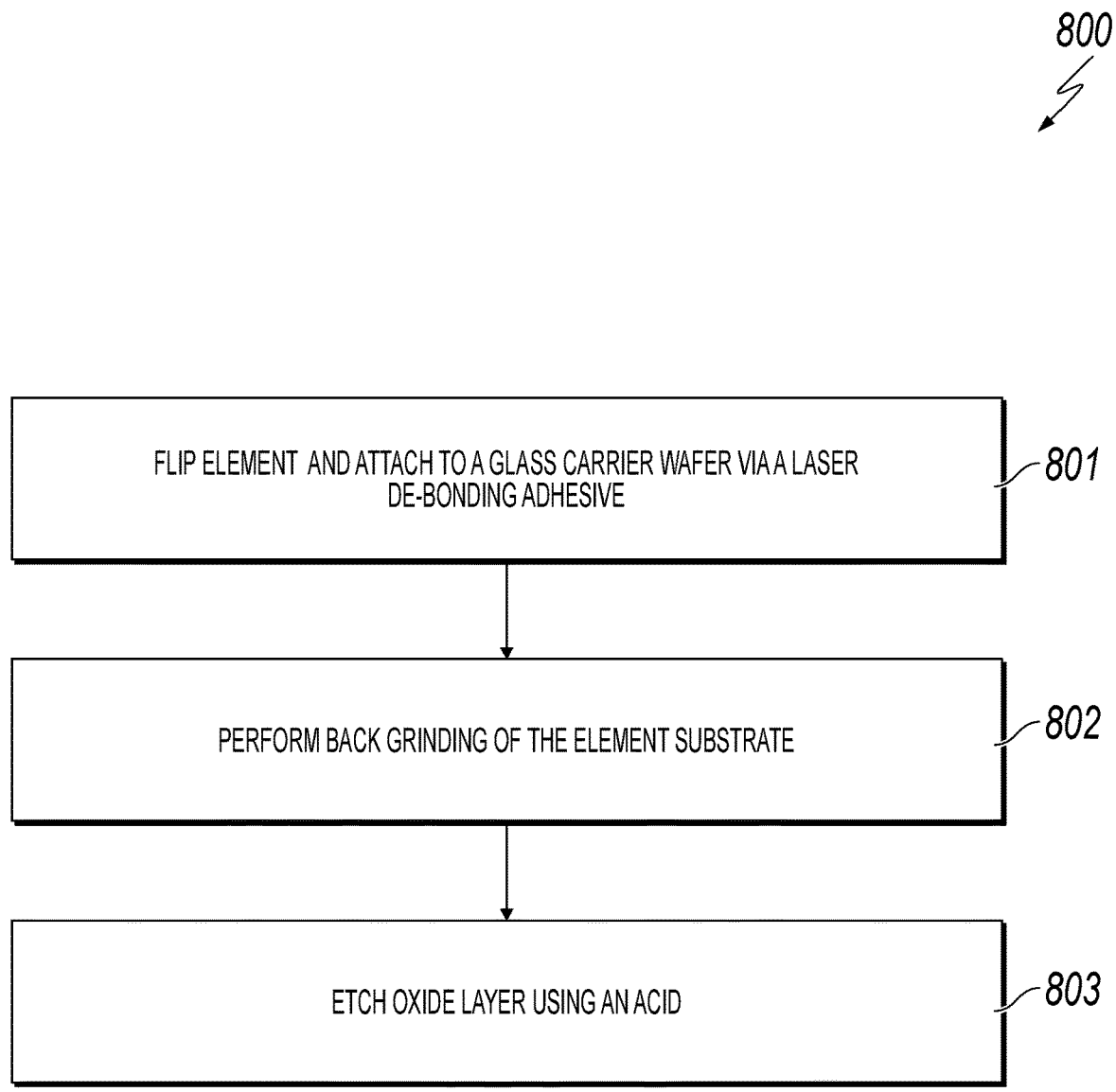
FIG. 8 is a flowchart of a method for utilizing wafer back-grinding for wafer dicing using the concepts for bulk-etch processes to facilitate subsequent pick-and-place in accordance with an embodiment of the present invention.
Figure 9A:
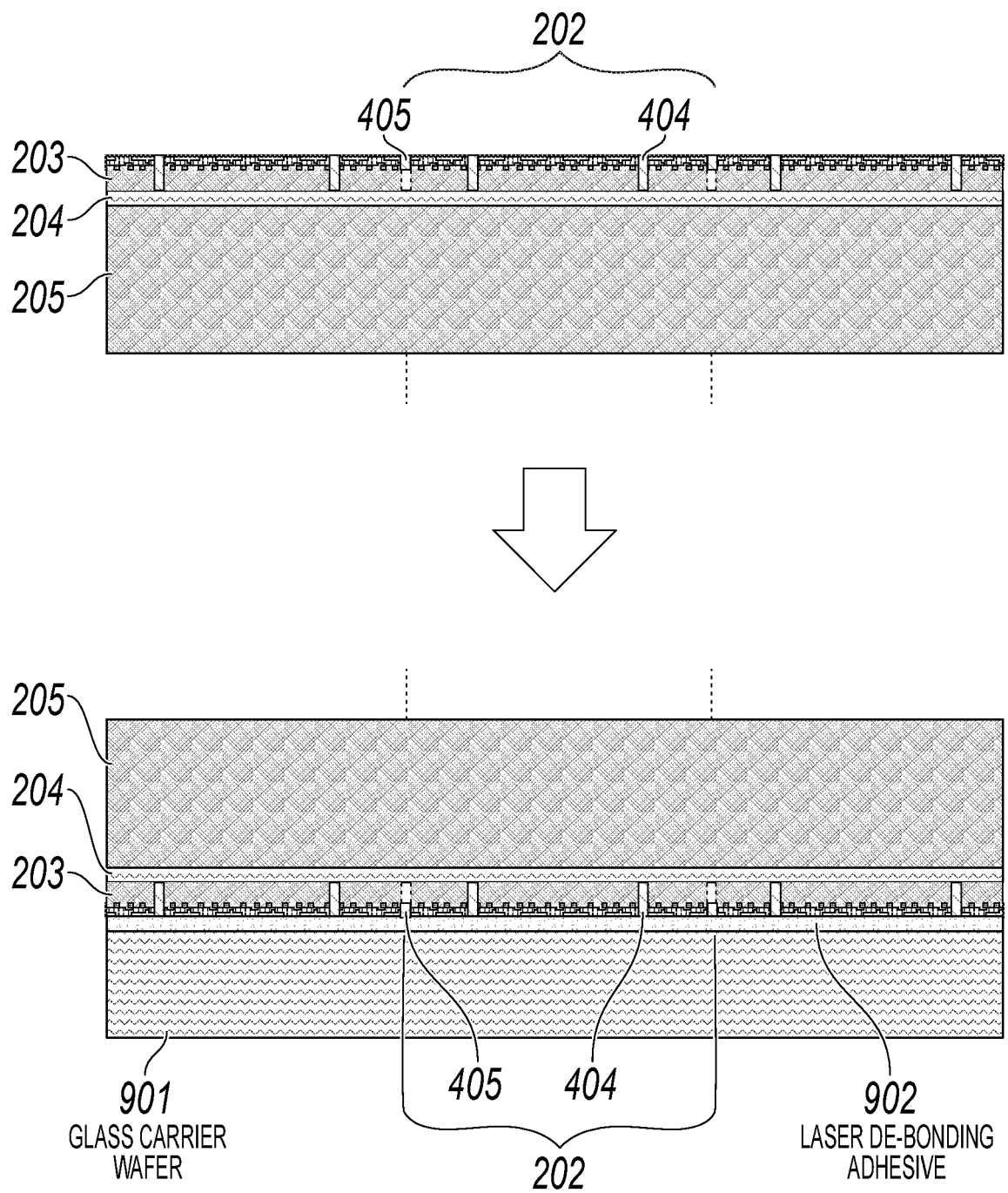
FIGS. 9A-9C depict the cross-sectional views for utilizing wafer back-grinding for wafer dicing using the steps described in FIG. 8 in accordance with an embodiment of the present invention.
Figure 9B:
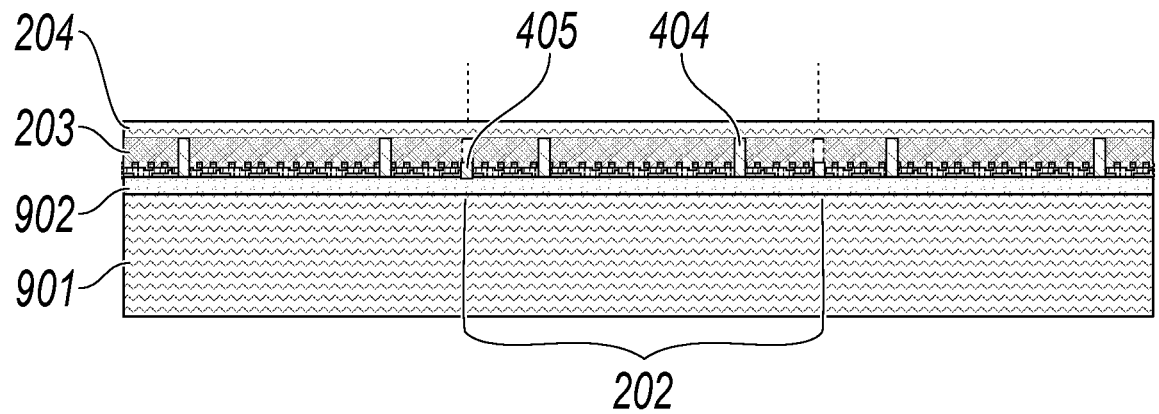
Figure 9C:
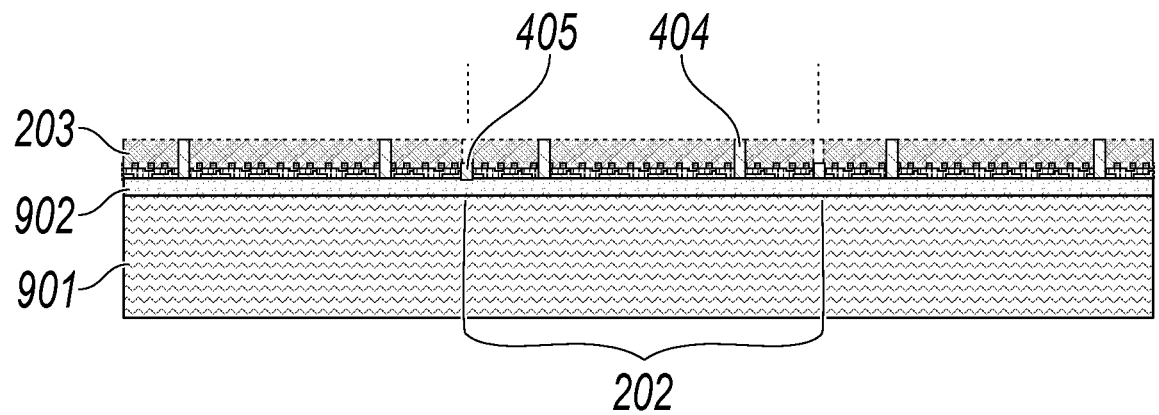

Referring now to FIG. 8, FIG. 8 is a flowchart of a method 800 for utilizing wafer back-grinding for wafer dicing using the concepts for bulk-etch processes to facilitate subsequent pick-and-place in accordance with an embodiment of the present invention. FIGS. 9A-9C depict the cross-sectional views for utilizing wafer back-grinding for wafer dicing using the steps described in FIG. 8 in accordance with an embodiment of the present invention.

Referring now to FIG. 8, in conjunction with FIGS. 9A-9C, in step 801, an element 202 is flipped and attached to a glass carrier wafer 901 via a laser de-bonding adhesive 902 (commercially available) as shown in FIG. 9A.

In step 802, back grinding of the element substrate 205 is performed as shown in FIG. 9B.

In step 803, sacrificial layer 204 is etched using an acid, such as HF.

A discussion of various concepts regarding element pickup is now deemed appropriate.

In one concept (referred to as concept "FP-1"), the basic principle is to selectively release individual elements by etching off the sacrificial layer while holding on to them using a vacuum superstrate. The key advantage of this concept is that there is minimal mechanical disturbance involved during the pickup process.

Figure 10:
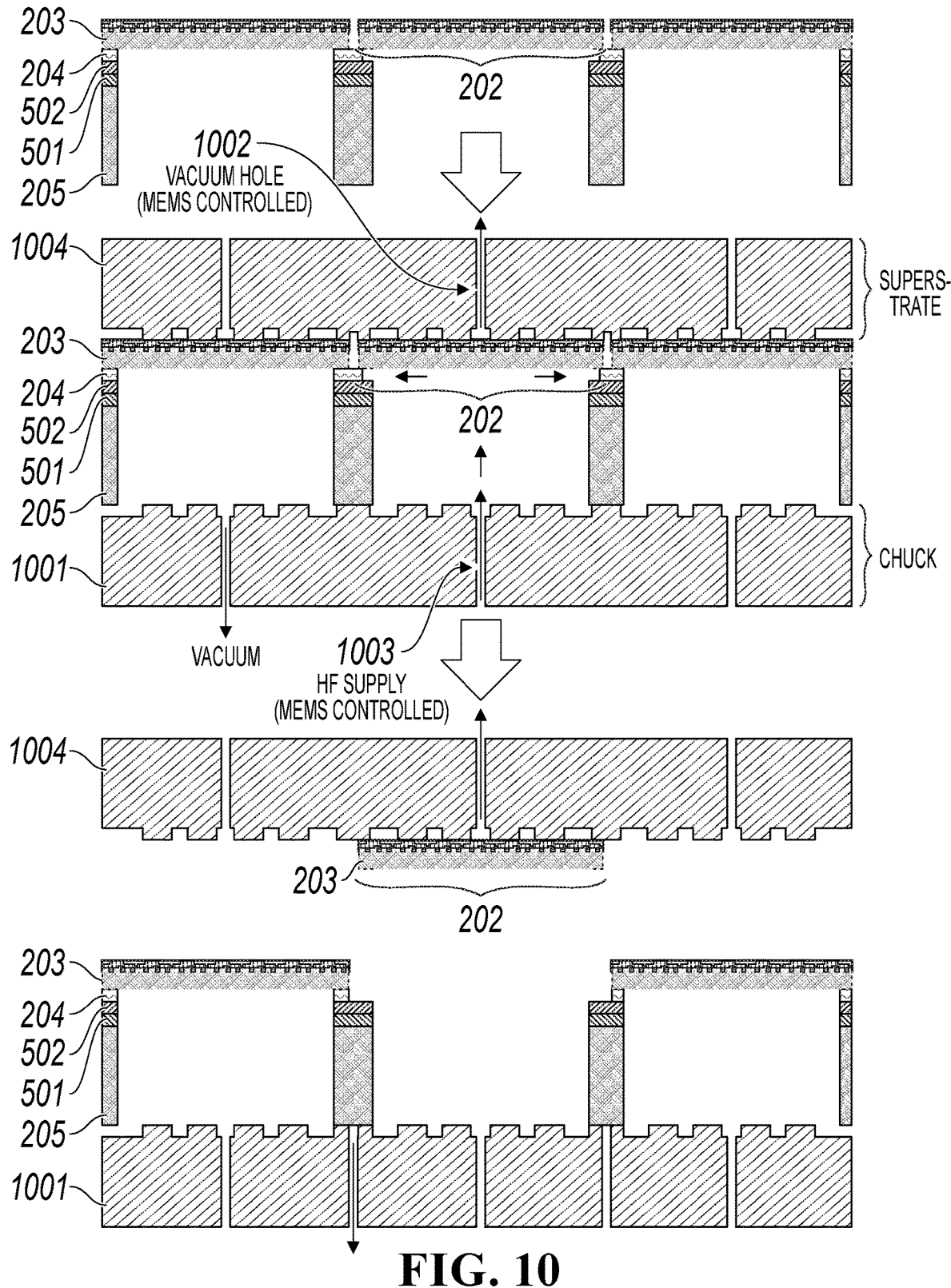
FIG. 10 illustrates a process for picking up an element in accordance with an embodiment of the present invention.

FIG. 10 illustrates a process for picking up an element in accordance with an embodiment of the present invention. Since the wafer of FIG. 5 already has through holes 405 in it, the etchant could be introduced using the wafer chuck 1001. Vacuum is pulled through the superstrate 1004. Both vacuum channels 1002 and etchant channels 1003 could be controlled using MEMS based valves.

Figure 11:
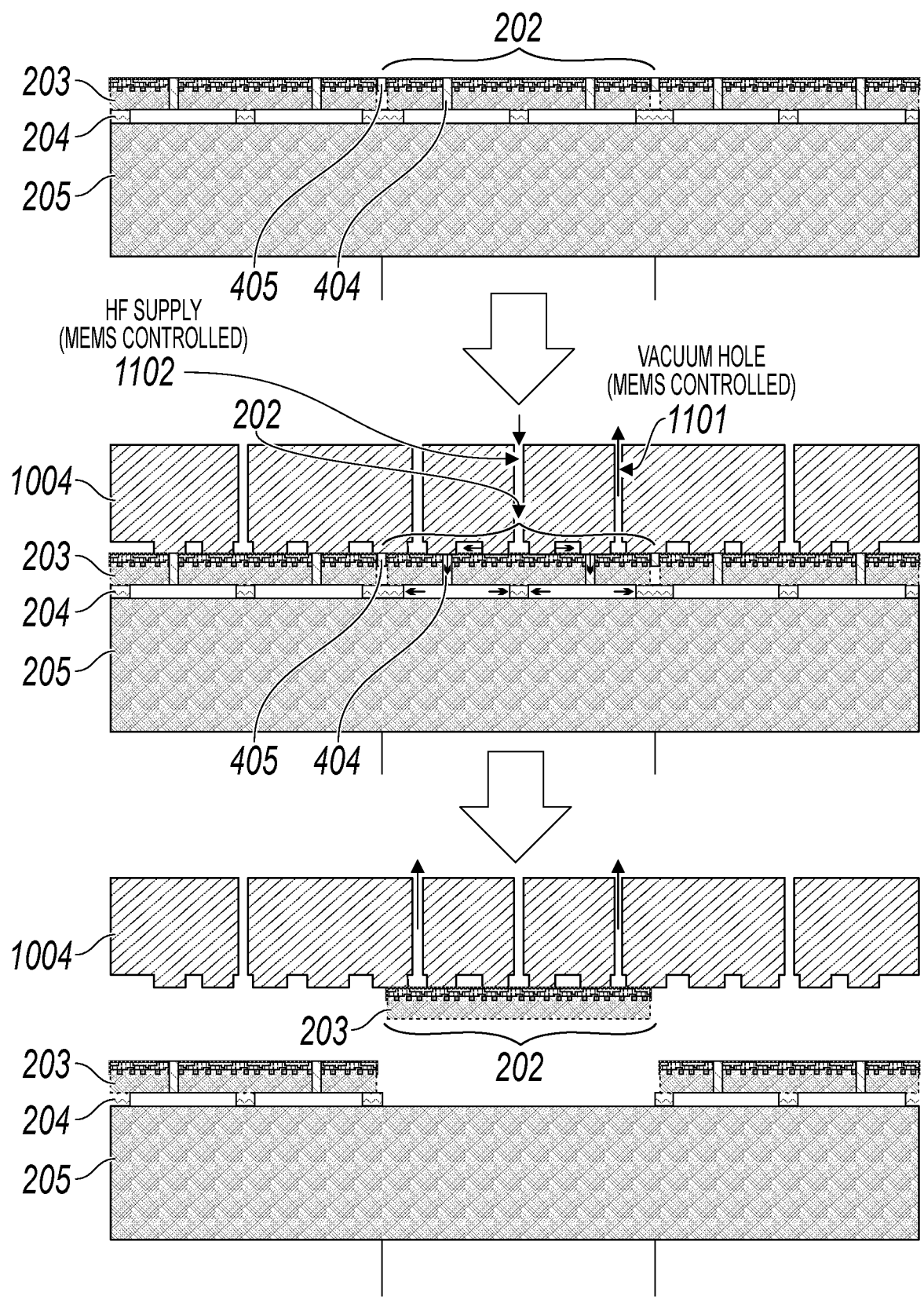
FIG. 11 illustrates an alternative process for picking up an element in accordance with an embodiment of the present invention.

FIG. 11 illustrates an alternative process for picking up an element in accordance with an embodiment of the present invention. Superstrate 1004 in this case needs to have both vacuum and etchant holes 1101, 1102 (which could again be controlled using MEMS valves). As previously mentioned, the sacrificial layer around the periphery of an element acts as a seal against etchant contamination to adjacent elements 202.

In a second concept (referred to herein as concept "FP-2"), the basic principle here is to mechanically pull elements off the source wafer using the vacuum superstrate.

Figure 12:
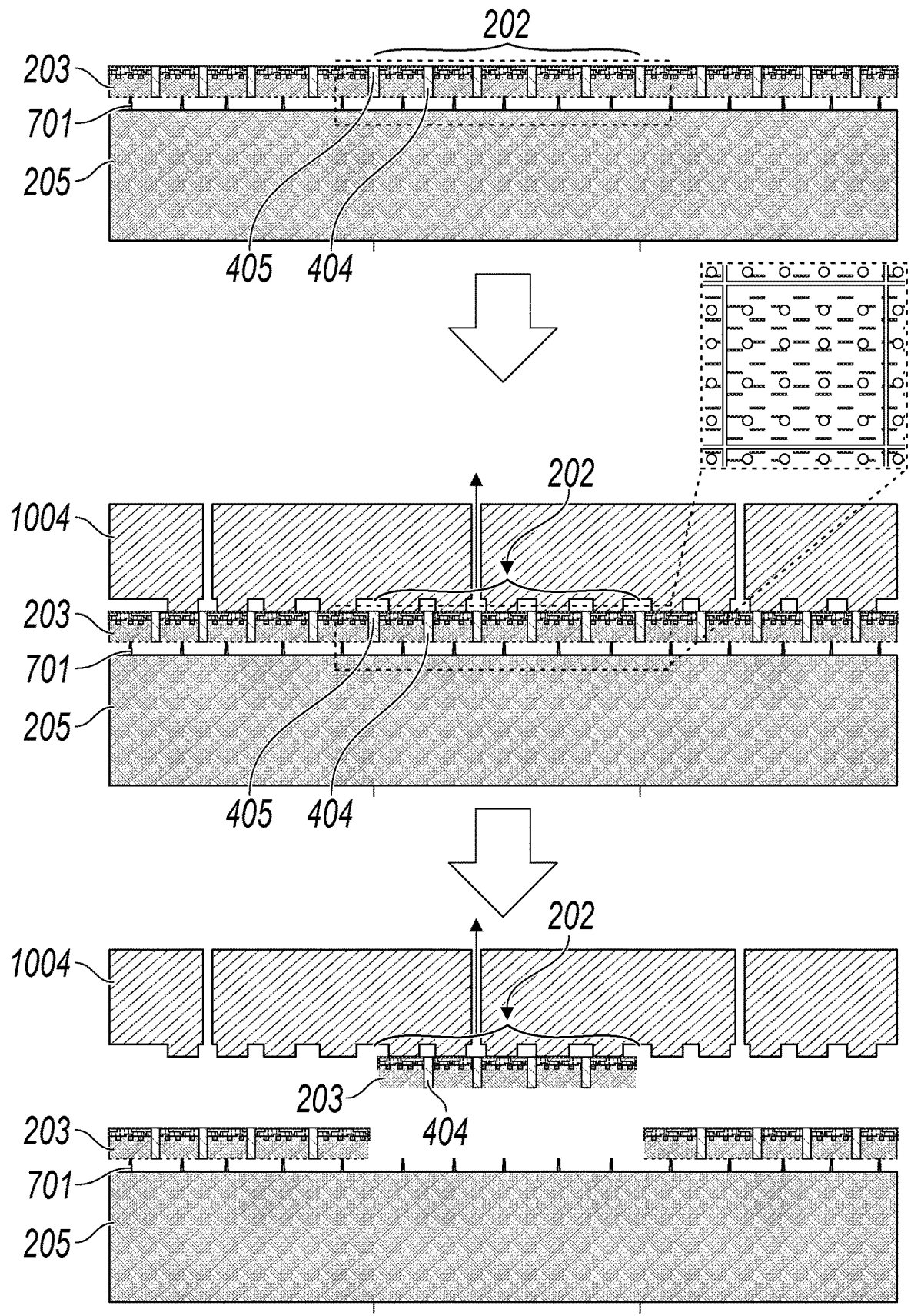
FIG. 12 illustrates a process for picking up an element while avoiding etching processes in accordance with an embodiment of the present invention.

This concept is ideally applied to the wafer of FIG. 7 Material strength calculations show that with a 100 μm element and pyramidal tethers with a top diameter of ~300 nm, vacuum suction should be more than sufficient to break the tethers. Thus, time consuming etching processes could be avoided. FIG. 12 illustrates a process for picking up an element while avoiding etching processes in accordance with an embodiment of the present invention.

In a third concept (referred to herein as concept "FP-3"), the basic principle, like FP-1, is to release elements by etching off the sacrificial layer while holding vacuum. The difference here is that all elements are released at once and transferred to an intermediate glass substrate with a UV-detacking adhesive on it as discussed in connection with FIGS. 13 and 14A-14E. This is done to make the subsequent selective release process much quicker. The selective release is done by exposing the underside of an element to UV light. Selective exposure can be achieved using light modulation devices, such as DMD (digital micromirror device). A further discussion regarding DMD is provided in Texas Instruments, "DMD 101: Introduction to Digital Micromirror Device (DMD)," 2013, which is hereby incorporated by reference in its entirety.

Figure 13:
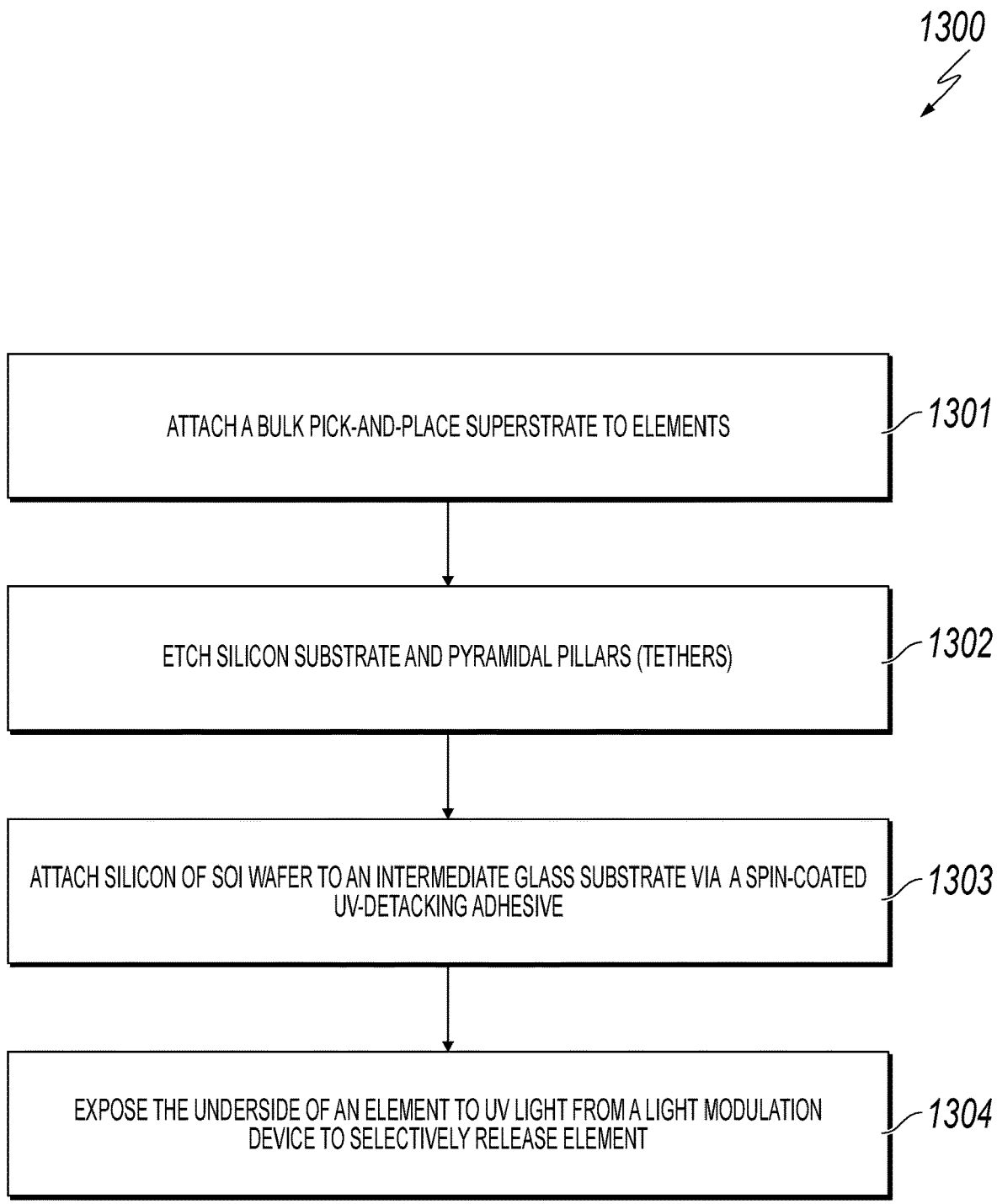
FIG. 13 is a flowchart of a method for picking up an element using the wafer of FIG. 10 in accordance with an embodiment of the present invention.

Referring to FIG. 13, FIG. 13 is a flowchart of a method 1300 for picking up an element using the wafer of FIG. 7 in accordance with an embodiment of the present invention. FIGS. 14A-14E depict the cross-sectional views for picking up an element using the steps described in FIG. 13 in accordance with an embodiment of the present invention.

Figure 14E:
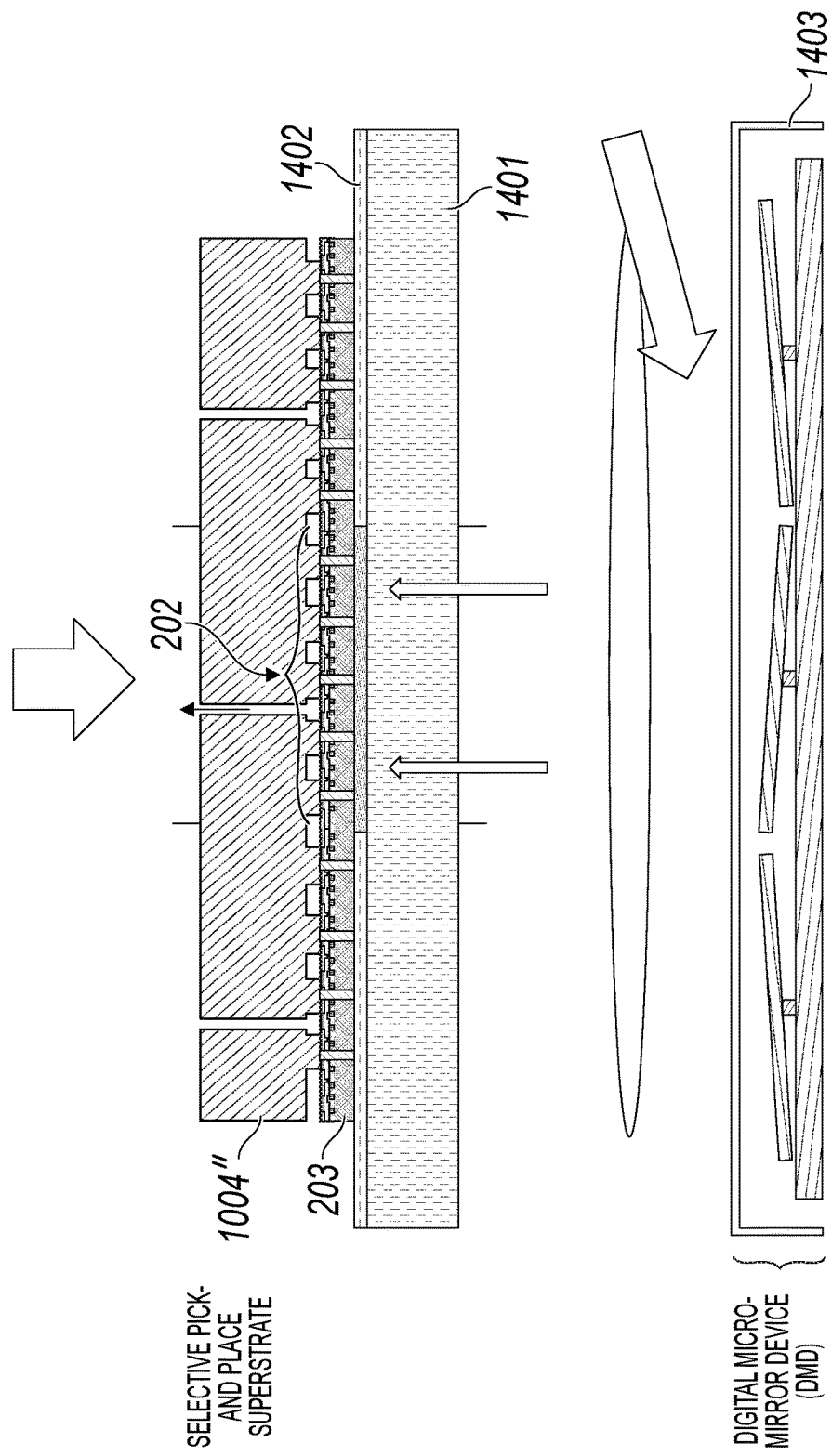

Referring now to FIG. 13, in conjunction with FIGS. 14A-14E, in step 1301, a bulk pick-and-place superstrate 1004' is attached to elements 202 as shown in FIGS. 14A-14B.

In step 1302, silicon substrate 205 and pyramidal pillars (tethers) 701 are etched as shown in FIG. 14C.

In step 1303, silicon 203 of SOI wafer 201 is attached to an intermediate glass substrate 1401 via a spin-coated UV-detacking adhesive (e.g., glue) 1402 as shown in FIG. 14D.

In step 1304, the underside of an element 202 is exposed to UV light from a light modulation device (e.g., DMD) 1403 to selectively release element 202. A selective pick-and-place superstrate 1004" is used to pick element 202.

In a fourth concept (referred to herein as concept "FP-4"), the concept applies to the back-ground superstrate of FIGS. 8 and 9A-9C. The basic principle, like FP-3, is to transfer elements to an intermediate glass wafer with a UV-detacking adhesive on it as discussed in connection with FIGS. 15 and 16A-16E.

Figure 15:
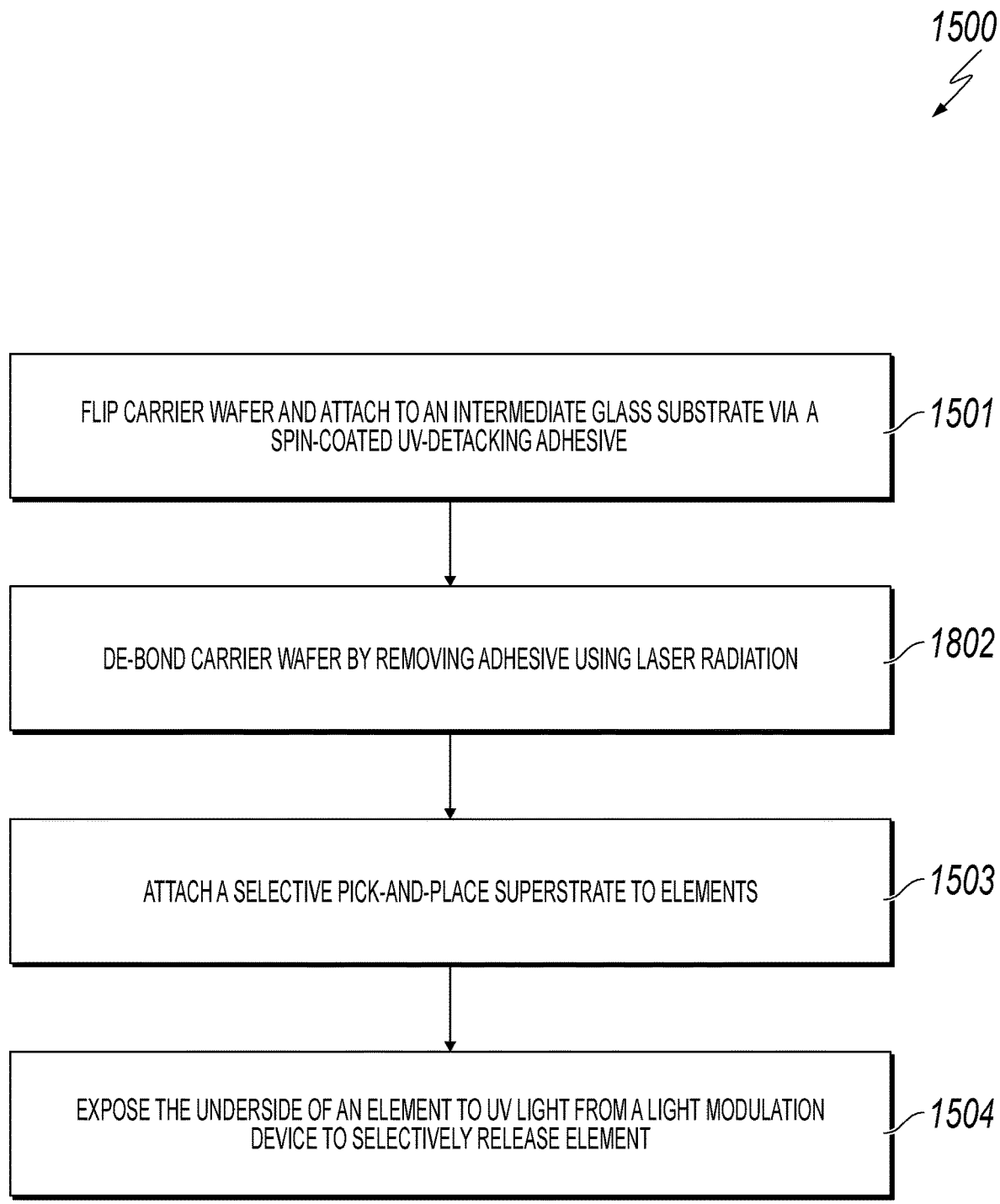
FIG. 15 is a flowchart of a method for picking up an element using the back-ground superstrate of FIGS. 8 and 9A-9C in accordance with an embodiment of the present invention.

Referring to FIG. 15, FIG. 15 is a flowchart of a method 1500 for picking up an element using the back-ground superstrate of FIGS. 8 and 9A-9C in accordance with an embodiment of the present invention. FIGS. 16A-16E depict the cross-sectional views for picking up an element using the steps described in FIG. 15 in accordance with an embodiment of the present invention.

Figure 16A:
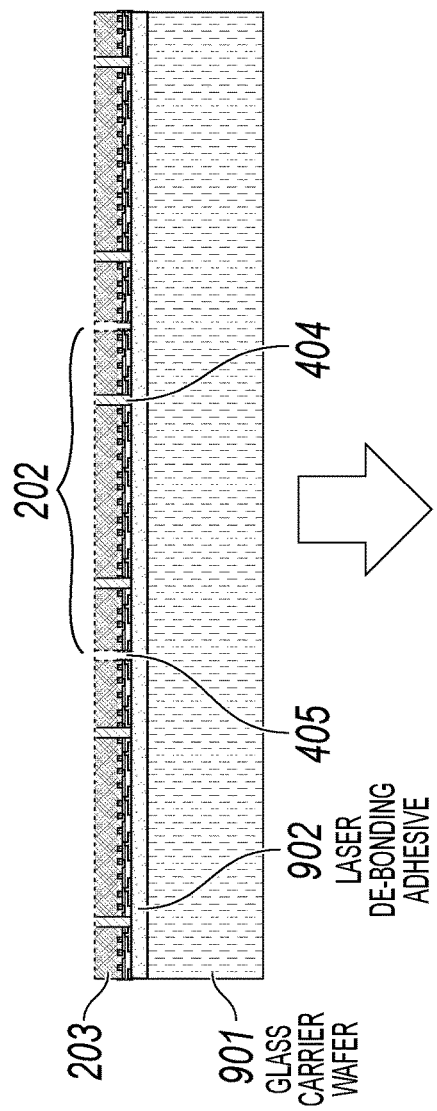
Figure 16B:
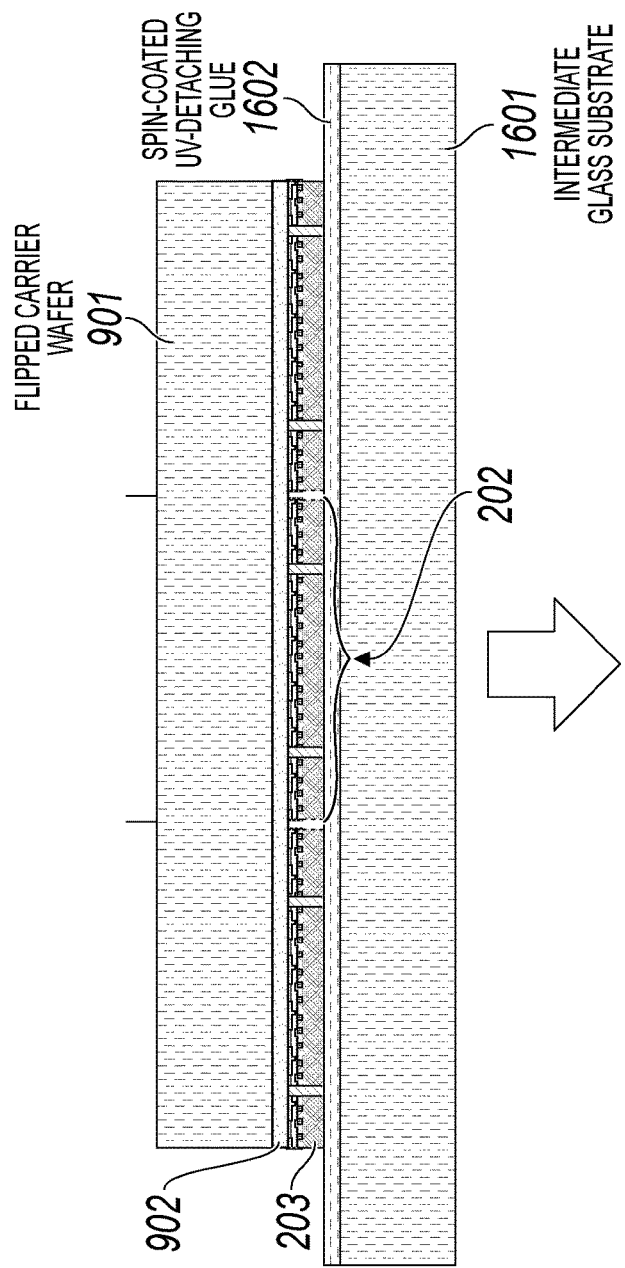

Referring now to FIG. 15, in conjunction with FIGS. 16A-16E, in step 1501, the carrier wafer is flipped and attached to an intermediate glass substrate 1601 via a spin-coated UV-detacking adhesive (e.g., glue) 1602 as shown in FIGS. 16A-16B.

In step 1502, the carrier wafer is de-bonded by removing adhesive 902 using laser radiation 1603 as shown in FIGS. 16C and 16D.

Figure 16E:
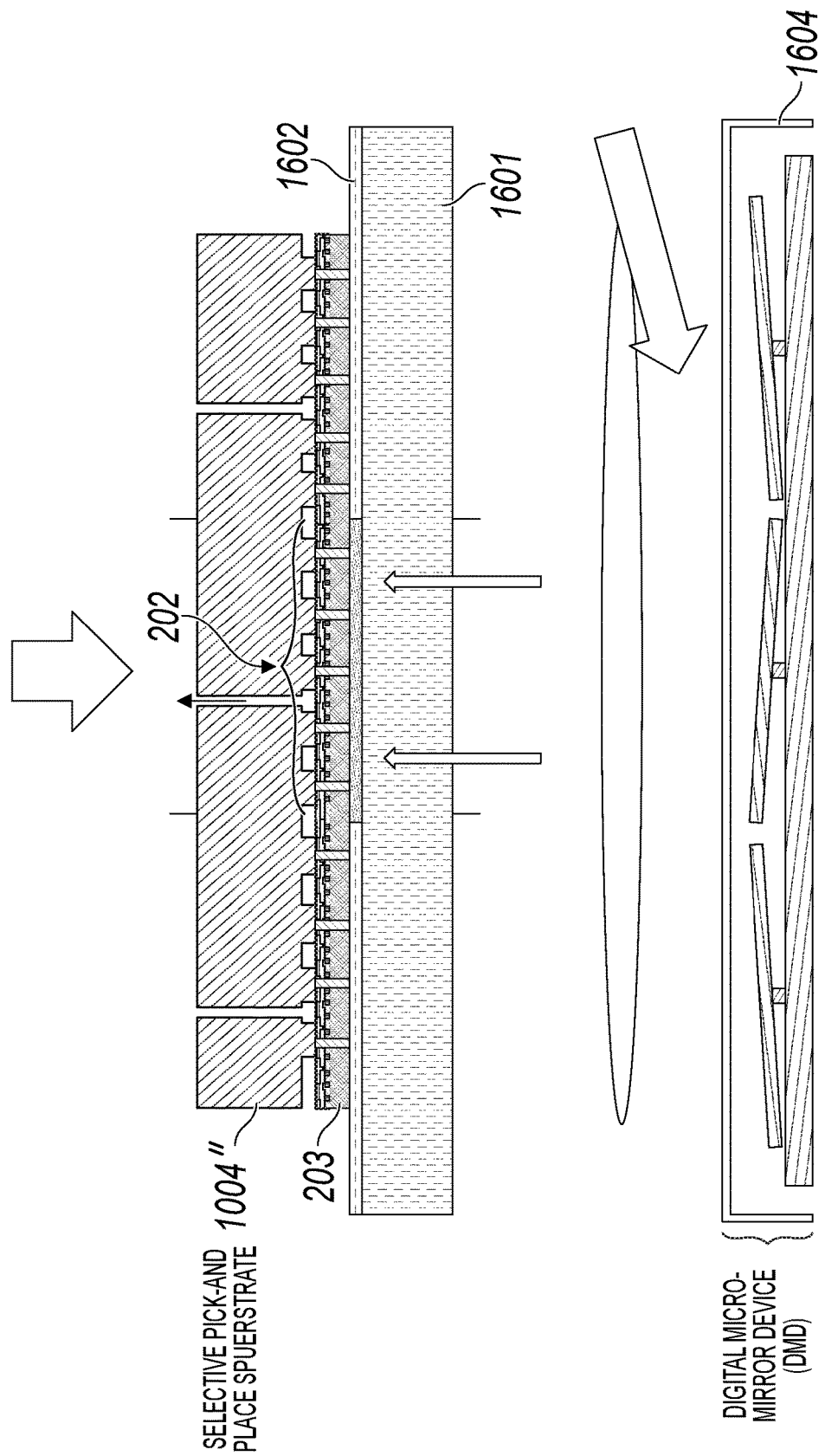

In step 1503, a selective pick-and-place superstrate 1004" is attached to elements 202 as shown in FIG. 16E.

In step 1504, the underside of an element 202 is exposed to UV light from a light modulation device (e.g., DMD) 1604 to selectively release element 202. A selective pick-and-place superstrate 1004" is used to pick element 202.

The vacuum based pick-and-place superstrates are a critical part of the whole assembly process. They ensure that assembly precision is maintained as elements are transferred from the source wafers to the product substrate.

Superstrates might be designed with the following factors in mind—

1. Pickup force and the fracture strength of functional elements
2. Parasitic motions
3. Topography control
4. Surface wear and flatness deterioration
5. Air flow and suction design
6. Thermal management—The superstrates could be temperature controlled to maintain optimal etchant and air temperatures. The temperature controllers could additionally be used to induce small deformations in the superstrate to correct registration errors. Said temperature control could be implemented using a variety of methods including peltier coolers and DMD based modulation of an IR source. A further discussion regarding thermal management is provided in Moon et al., "Thermally Controlled Alignment for Wafer-Scale Lithography," Journal of Micro/Nanolithography, MEMS, and MOEMS 12(3), 031109, Aug. 28, 2013, which is hereby incorporated by reference in its entirety.
7. Distortion control
8. Superstrate-element adhesion characteristics
9. Programmability of pickup locations—Selective pick-and-place superstrates could have an embedded layer of MEMS valves. Large arrays of MEMS valves for fluid flow control have previously been shown in research papers. Alternatively, a custom pickup layer could be used for each specific pickup configuration. A further discussion regarding programmability of pickup locations is provided in Vandelli et al., "Development of a MEMS Microvalve Array for Fluid Flow Control," Journal of Microelectromechanical Systems 7.4, 1998, pp. 395-403, which is hereby incorporated by reference in its entirety.
10. Fabrication—The superstrates are fabricated by bonding together multiple separately fabricated layers. Such a technique has been used before to fabricate wafer chucks with intricate micron-scale features.

Figure 17:
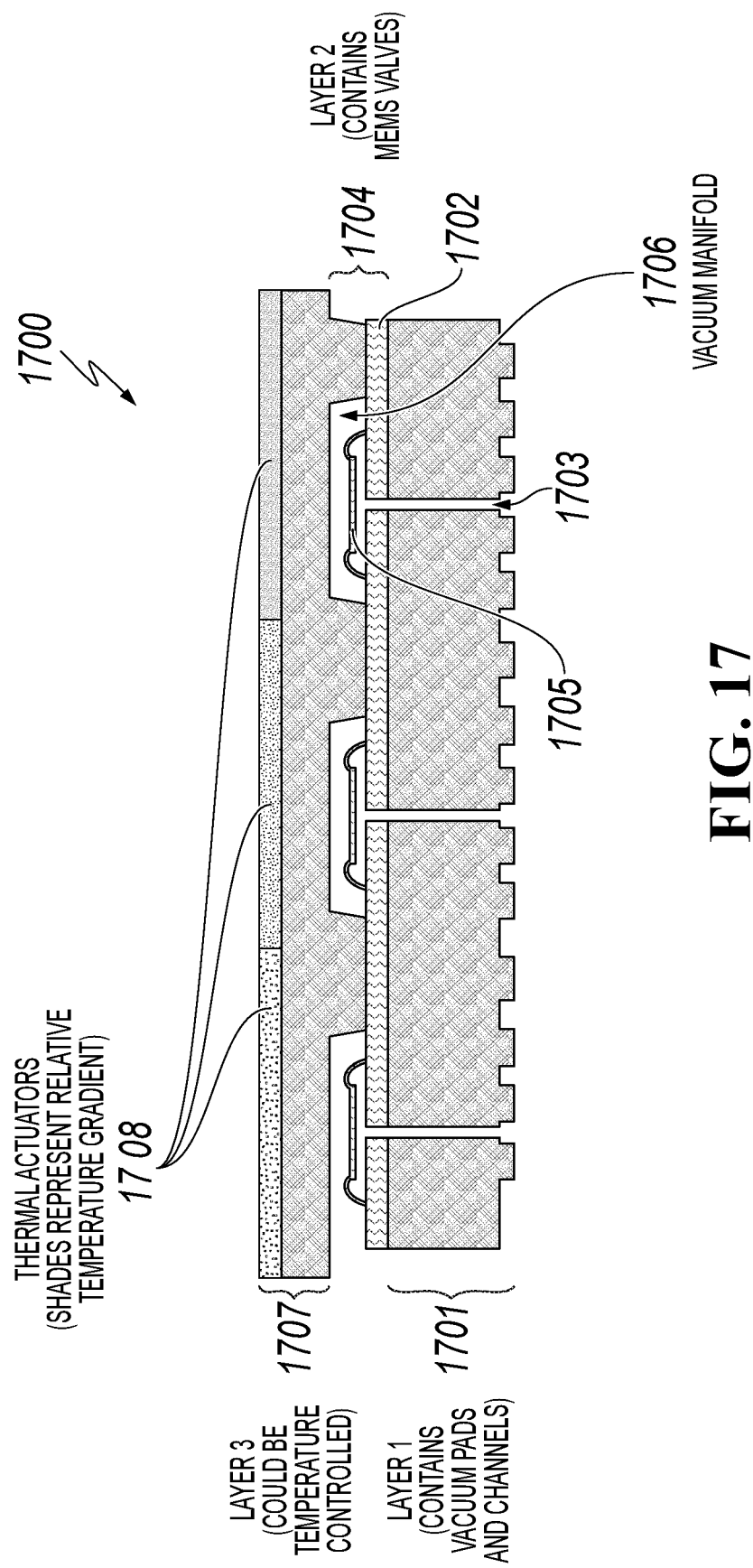
FIG. 17 illustrates a multi-layered design for the selective pick-and-place superstrate discussed in concept FP-2 in accordance with an embodiment of the present invention.
Figure 18:
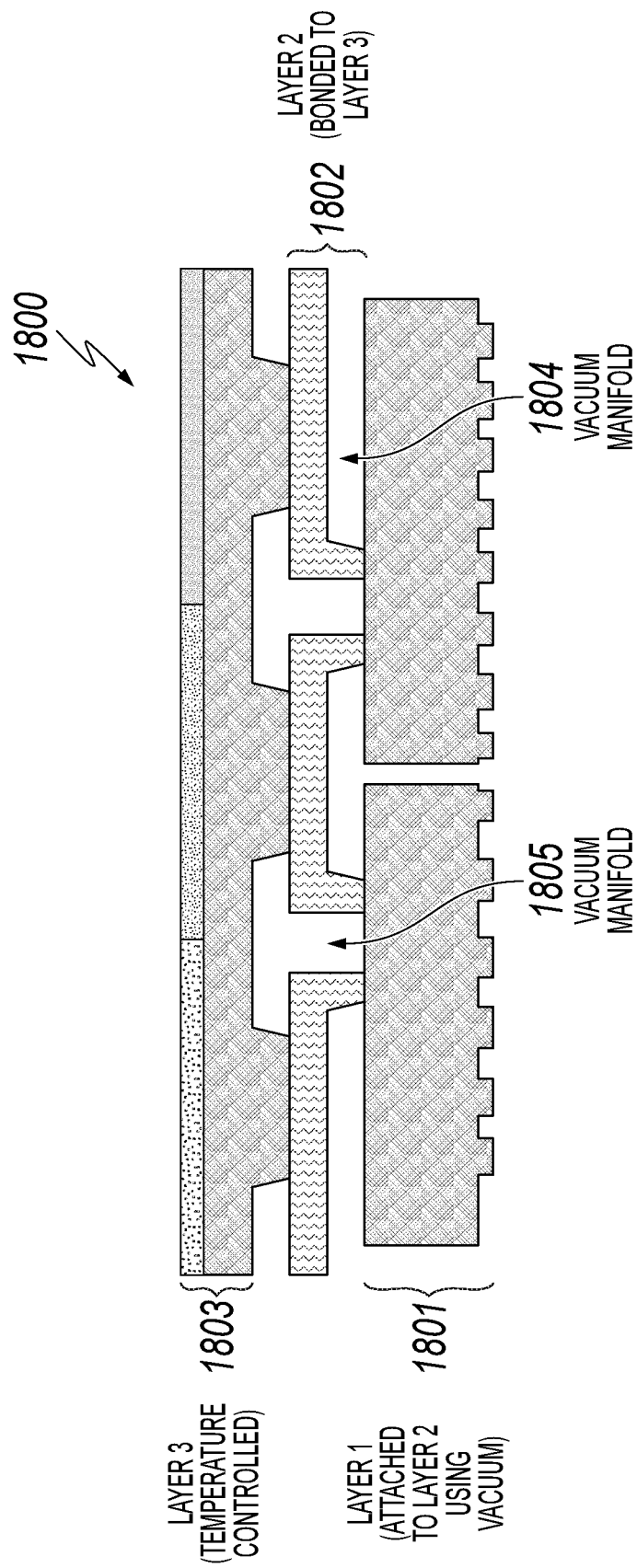
FIG. 18 illustrates a selective pick-and-place superstrate with custom pickup layer 1 in concept FP-2 in accordance with an embodiment of the present invention.
Figure 19:
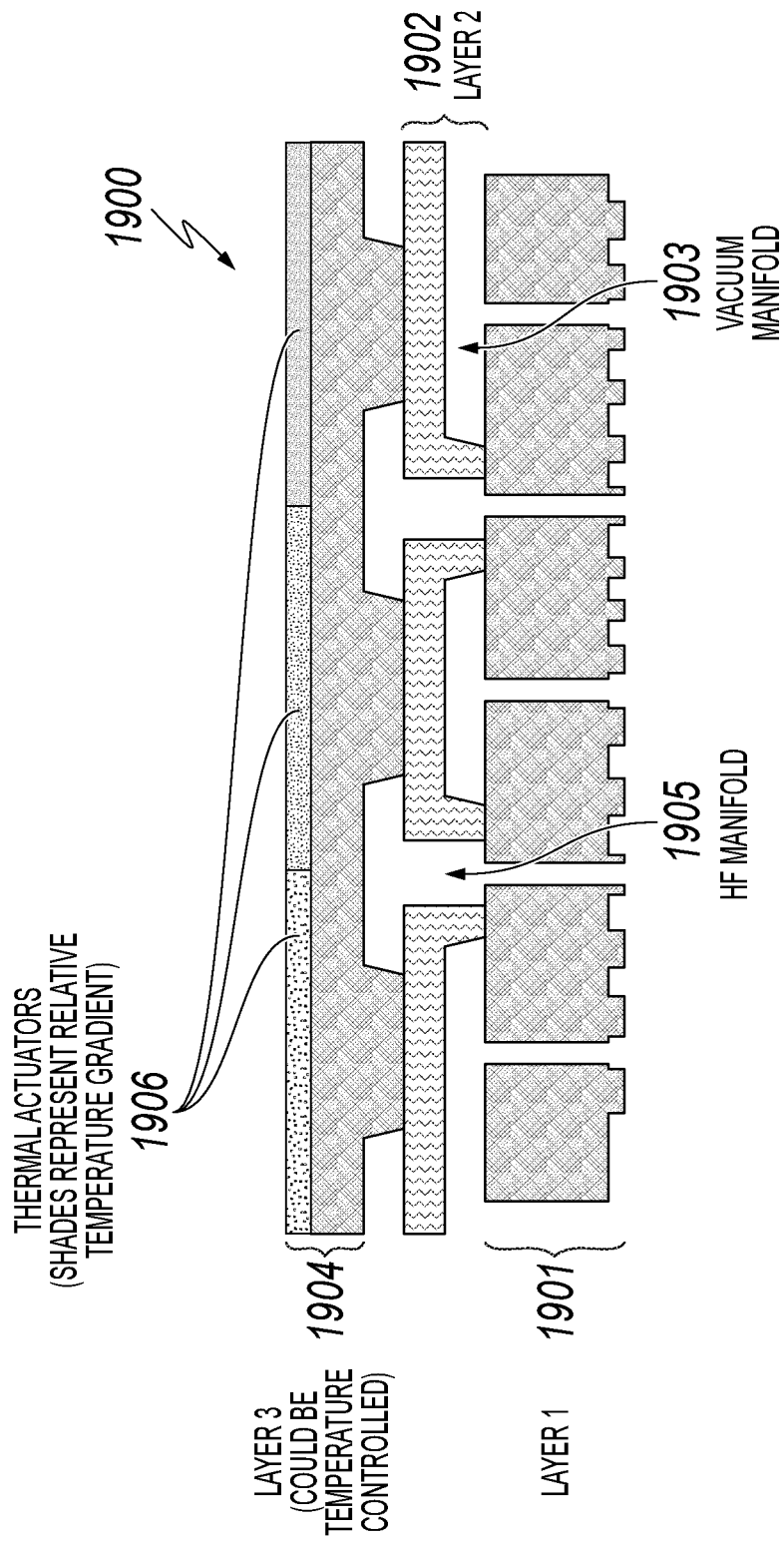
FIG. 19 illustrates a multi-layered design of the bulk pick-and-place superstrate discussed in concept FP-3 in accordance with an embodiment of the present invention.

FIGS. 17-19 show various possible designs for the pick-and-place superstrates. FIG. 17 illustrates a multi-layered design for the selective pick-and-place superstrate discussed in concept FP-2 in accordance with an embodiment of the present invention. FIG. 18 illustrates a selective pick-and-place superstrate with custom pickup layer 1 in concept FP-2 in accordance with an embodiment of the present invention. FIG. 19 illustrates a multi-layered design of the bulk pick-and-place superstrate discussed in concept FP-3 in accordance with an embodiment of the present invention.

In one embodiment, water based temperature control techniques are used for distortion control of the superstrates.

Selective pick-and-place superstrates could have an embedded layer of MEMS valves. Large arrays of MEMS valves for fluid flow control have been shown before in research. Alternatively, a custom pickup layer could be used for each specific pickup configuration as shown in FIG. 18.

As shown in FIG. 17, pick-and-place superstrate 1700 includes layer 1 1701 which contains vacuum pads 1702 and channels 1703. Superstrate 1700 further includes layer 2 1704 which contains MEMS valves 1705 and vacuum manifold 1706. Superstrate 1700 additionally includes layer 3 1707, which can be temperature controlled, which contains thermal actuators 1708 (different shades represent relative temperature gradient).

As shown in FIG. 18, pick-and-place superstrate 1800 includes layer 1 1801 which is attached to layer 2 1802 using a vacuum. Superstrate 1800 further includes layer 2 1802 which is bonded to layer 3 1803. Layer 2 1802 includes a vacuum manifold 1804. Furthermore, superstrate 1800 includes layer 3 1803, which can be temperature controlled, which includes a vacuum manifold 1805.

As shown in FIG. 19, pick-and-place superstrate 1900 includes layer 1 1901 and layer 2 1902. Layer 2 1902 includes a vacuum manifold 1903. Superstrate 1900 further includes layer 3 1904, which can be temperature controlled, which may include a HF manifold 1905. Furthermore, superstrate 1900 includes thermal actuators 1906 (different shades represent relative temperature gradient).

This is one possible implementation of the superstrate, among many others. The vacuum pickup mechanism consists of a silicon plate with an array of 250 nm diameter vacuum holes. The backside of this plate is connected to a vacuum pump. A thermally conducting material like Si, which also has a low thermal coefficient of expansion (~3 ppm/° C.), allows the use of water cooling techniques for alignment control. The silicon plate can be fabricated by spin coating a photoresist on to a silicon wafer and then exposing the wafer to focused light from a UV-compatible DLP micro-mirror array in order to create the exact vacuum pattern desired in the assembly process. The silicon wafer can then be through etched using deep reactive ion etching in order to create the vacuum holes in the silicon plate. The array of vacuum holes use individually addressable electrostatic MEMS actuators at each hole in order to open and close a valve attached to that hole. The vacuum holes on the superstrate may or may not be arranged in substantially the same lattice as the final product wafer.

The MEMS valves will consist of ~100 nm thick cantilevers suspended 50 nm above the 250 nm holes on the backside of the pickup plate. Electrodes will be patterned around each of the holes on the backside of the plate in order to create the electrostatic actuator that will be used to pull the cantilever beam down to the surface and close the hole to that vacuum port. The entire surface of the vacuum plate will be coated in an anti-stick coating in order to prevent the cantilever from sticking to the surface of the plate after the electrostatic charge has been removed. In this setup, each actuator will be made individually addressable using the same method TI developed for their electrostatically actuated micro-mirror arrays. In this method, a CMOS memory circuit is patterned below the bottom electrode and is used to set the on/off state of the actuator. The state of each memory circuit is set using a parallel row bus to address each of the pixels. Once the memory circuits have been set, a clocking pulse is applied to the entire system in order to set the on/off of each actuator based on the on/off value of the memory circuit associated with that actuator. Each actuator is then kept in that state until the memory circuits are reset and a new clocking pulse is applied.

Figure 20:
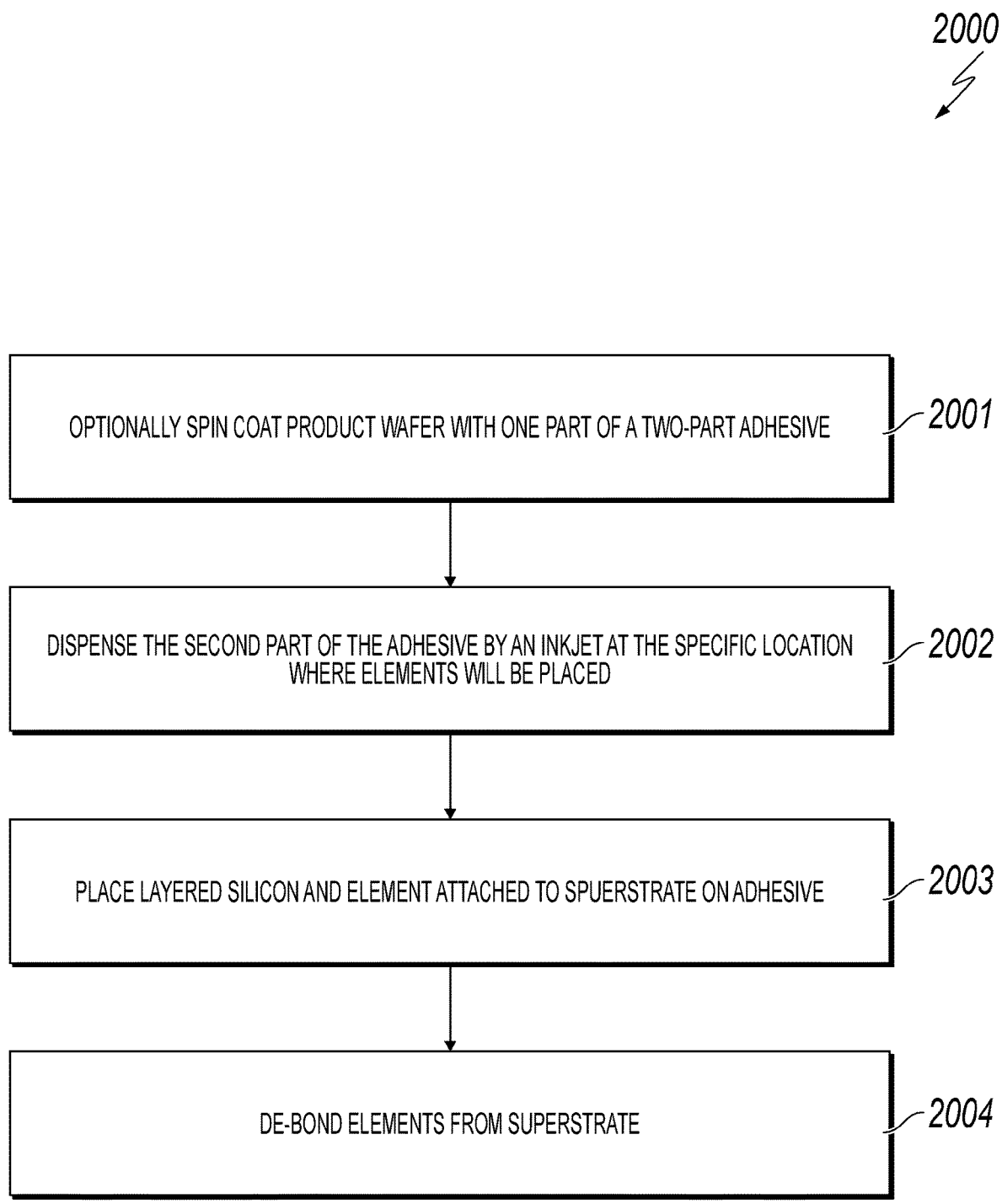
FIG. 20 is a flowchart of a method for aligning, placing and bonding elements in accordance with an embodiment of the present invention.
Figure 21C:
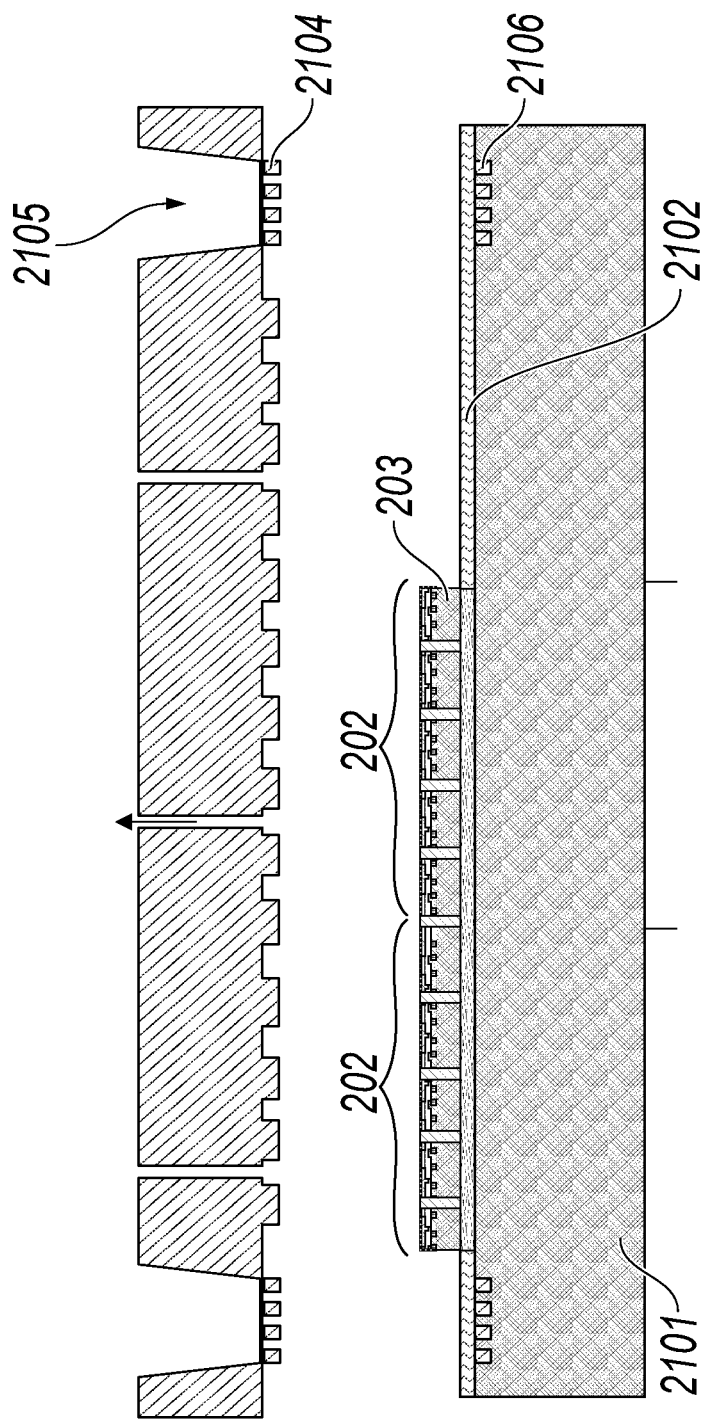

Referring now to FIG. 20, FIG. 20 is a flowchart of a method 2000 for aligning, placing and bonding elements in accordance with an embodiment of the present invention. FIGS. 21A-21C depict the cross-sectional views for aligning, placing and bonding elements using the steps described in FIG. 20 in accordance with an embodiment of the present invention.

Referring to FIG. 20, in conjunction with FIGS. 21A-21C, in step 2001, at the beginning of the pick-and-place cycle, the product wafer 2101 is optionally spin coated with one part 2102 of a two-part adhesive as shown in FIG. 21B.

In step 2002, just before the placement step, an inkjet dispenses the second part of the adhesive 2103 at the specific location where elements 202 will be placed as shown in FIGS. 21A-21B. Placement accuracies of <10 μm are commonly achieved using inkjets, which should be sufficient for elements 202 greater than 25 μm on a side. Further improvement in inkjet drop placement could be achieved using one or more of the following approaches: (1) reducing the gap between the nozzle plate of the inkjet and the substrate surface to well below a millimeter; and (2) decreasing the scanning speed to well below 1 m/s.

In step 2003, layered silicon 203 and element 202 attached to superstrate 1004 are placed on adhesive 2103 (or 2102 and 2103) as shown in FIG. 21B.

In step 2004, elements 202 are de-bonded from superstrate 1004 as shown in FIG. 21C.

An alternative to the spin coating technique discussed above is to use two inkjets for concurrently dispensing the two components of the two-part adhesive. The inkjets could be programmed to dispense the two components in such a way that there is at least a partial overlap between the two drops. This overlap could happen prior to the assembly of the element, or the element assembly step could urge the drops to mix with each other.

As the picked elements 202 are brought close to product wafer 2101, coarse alignment is first done as shown in FIG. 21A. FIG. 21A illustrates superstrate 1004 with alignment marks 2104 and observation windows 2105. This is followed by fine alignment, which could be done once element 202 is touching the adhesive 2103 (or 2102 and 2103) (in-liquid) The fine alignment uses alignment marks 2106 in substrate 2101 as shown in FIG. 21B. The vacuum superstrate 1004 remains attached to elements 202 until the adhesive reaches its gel point, after which elements 202 are securely attached to substrate 2101.

In one embodiment, fine alignment is done using more alignment marks patterned into superstrate (marks 2104) and patterned into the product substrate (marks 2106). With this type of alignment system, it should be possible to achieve sub-5 nm alignment accuracies. One advantage of using liquid adhesives as the bonding agent is that in-liquid alignment could be done, which would ensure minimal topography variation in superstrate 1004 during the placement step. A further discussion regarding alignment is provided in Cherala et al., "Nanoscale Magnification and Shape Control System for Precision Overlay in Jet and Flash Imprint Lithography," IEEE Trans. Mechatronics, Vol. 20, No. 1, 2015, pp. 122-132, which is hereby incorporated by reference in its entirety.

The two-part adhesive should ideally have a low curing time at room temperature or moderately elevated temperatures. Epoxy hardeners, such as Ancamine® 2678, has a thin film set time of ~2 seconds at room temperature and has a low viscosity of 35 cPs which allows it to be applied using inkjet nozzles. The uncured adhesive would generally have a viscosity in the range of 1-100 cPs. The formulation of the optimal adhesive may require blending of multiple components of epoxy resins and hardeners as well as accelerators if the setting time needs to be shortened.

Additionally, the adhesive should exhibit shrinkage during the curing process. This is to ensure that elements 202 end up closer to the product substrate 2101 post-cure and thus superstrate 1004 does not undergo undesirable interface with elements 202 that are already present on product substrate 2101. In addition to adhesive shrinkage, undesirable superstrate interference with feedstock could also be avoided by adjusting the thickness of the superstrate—calculations show that a 4 mm thick SiC superstrate layer, simply supported on four feedstocks 30 mm apart (the maximum size of a die), would not bow by more than 1 nm at its center because of self-weight.

Alternatively, a UV-curing adhesive could be used to temporarily attach elements to the product substrate. This would necessitate the superstrate to be fabricated out of UV-transparent materials, such as sapphire ($Al_2O_3$) or UV-transparent SiC (such SiC wafers are available from sources including Cree, Inc.).

Once the product substrate has been fully populated with elements, a material deposition/coating step using vacuum based chemical deposition processes, such as sputtering, atomic layer deposition (ALD) and chemical vapor deposition, could additionally be done to further secure the elements to the substrate.

Alternatively, an anodic bonding step could replace the adhesive process altogether.

Once the first set of elements is assembled, the assembly process could be repeated for each additional type of element. In a multilayer application, between each layer of elements an interposer layer could also be added. This interposer layer could incorporate carbon nanotube (CNT) forests for mechanical adhesion, electrical/thermal/optical connections as well as through-vias.

With decreasing feature sizes, the mask cost to pattern these features has skyrocketed. The cost for a full set of masks is about $1.5M for 90 nm lithography node and can be as high as $2M for 65 nm lithography node (according to some estimates, mask writing time goes up as a power of five as feature sizes are decreased). In addition, higher complexity of large designs increases the number of design re-spins. The above two factors lead to considerable increase in the nonrecurring engineering cost (NRE) for standard cell ASICs, which can become prohibitively expensive for low to mid volume applications, such as custom chips for wearables, scientific and medical applications. Field programmable gate array (FPGAs) offer an acceptable solution for fast prototyping and ultra-low volume applications, but are generally not seen as a replacement for ASICs because of their highly inefficient space utilization and less than desirable timing.

A discussion regarding the novel application of the above-described vacuum based assembly technique for fabrication of ASICs using a limited number of mass-produced feedstock logic circuits is provided below. This would lead to sharing of mask cost for sub-100 nm feature sizes across a large number of ASIC designs, decreasing the cost for individual designs. The concept of constructing ASICs using repeating logic feedstocks is based on previous works where it has been shown that ASICs made of via/metal configured structured feedstocks can achieve space utilization and performance close to cell based ASICs. In the proposed technique, however, there is significantly more choice in terms of feedstock types and configuration.

The assembly technique discussed above can be directly applied to the problem of ASIC fabrication using discrete feedstocks (with element 202 now being a feedstock). The processes and mechanical design concepts should follow these general guidelines: (1) precision of assembly (sub-100 nm 3σ) is of primary importance; (2) time of assembly is important (but of lower importance than assembly precision); and (3) processes which might produce particles need to be avoided.

Figure 22:
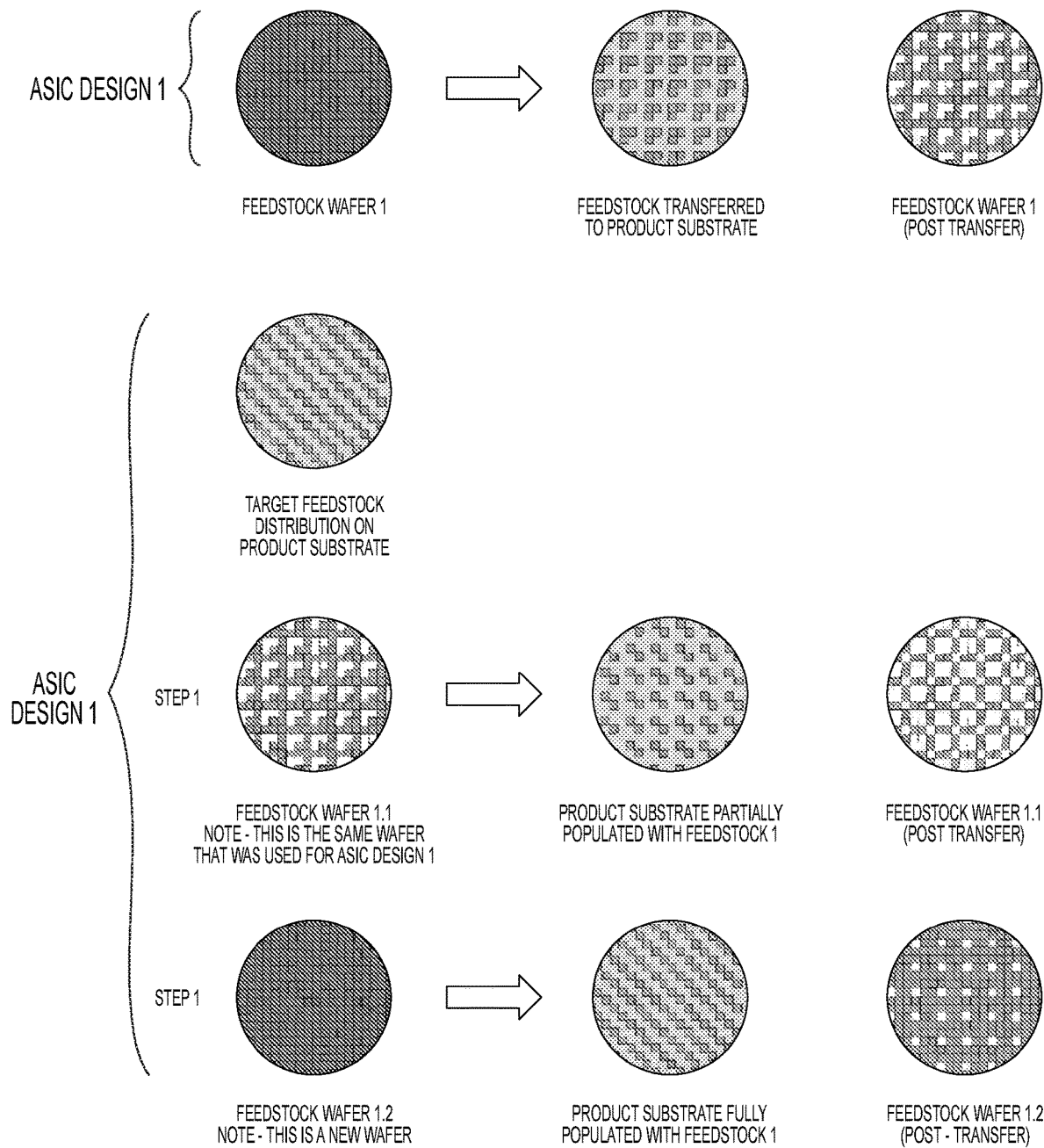
FIG. 22 illustrates the optimal element utilization strategy in accordance with an embodiment.

Since the same feedstock wafers are used to supply feedstock to multiple ASIC designs, one problem that arises is that of feedstock utilization. Referring to FIG. 22, FIG. 22 illustrates the optimal feedstock utilization strategy in accordance with an embodiment. ASIC Design 2, which requires a specific distribution of feedstock 1 (different from the distribution for ASIC Design 1), cannot be fully populated using the existing feedstock in feedstock wafer 1 alone. A pick-and-place strategy is now proposed in which a stockpile of feedstock wafers for each feedstock type is maintained. At the start, the maximum possible feedstocks are used from the maximally depleted feedstock wafer (wafer 1.1 in FIG. 22). The process then continues on to use the maximum possible feedstocks from lesser depleted wafers (e.g., wafer 1.2 in FIG. 22) until the product substrate is fully populated with feedstocks of one type. At a predefined point, when the maximally depleted wafer has too few feedstocks (below a threshold value) to be efficiently utilized, it would either be discarded or stored for possible salvage. The salvage tool would be similar in construct to the pick-and-place tool described before, but would rearrange feedstocks instead of transferring them to a product wafer.

Figure 23:
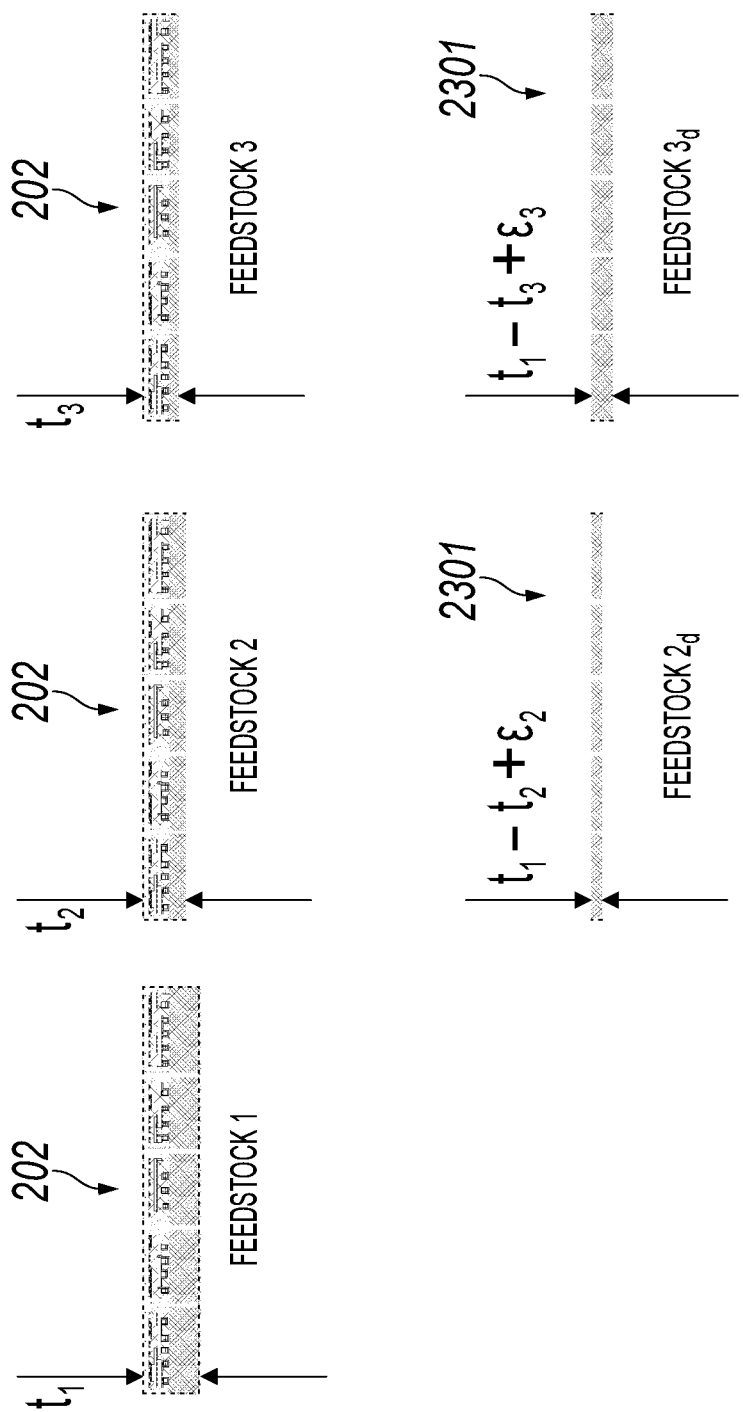
FIG. 23 illustrates dummy elements for solving the varying height problem in accordance with an embodiment of the present invention.

Feedstocks from different source wafers could generally have different feedstock thicknesses. Assembling such feedstocks could lead to problems with undesirable superstrate interference, and lack of planarization. Avoiding undesirable superstrate interference can be achieved by several approaches, two exemplar approaches are listed below:

1. Ensuring that every assembled feedstock is slightly higher (say 5-10 nm) than the previously assembled feedstock. (This eventually leads to a lack of planarization which is addressed separately below.) The ability to ensure a pre-specified and distinct assembled height for each feedstock can be achieved by the following exemplar approaches:
   a) Dummy feedstocks, see FIG. 23 for a case with 3 feedstocks. FIG. 23 illustrates dummy feedstocks 2301 (identified as "Feedstock $2_d$" and "Feedstock $3_d$") for solving the varying height problem in accordance with an embodiment of the present invention. For the general case with n feedstocks with potentially distinct thicknesses $\{t_1<t_2<\ldots<t_n\}$, there would be (n−1) dummy feedstocks with thicknesses $\{(t_n-t_1+\varepsilon_1)>(t_n-t_2+\varepsilon_2)>\ldots>(t_n-t_{(n-1)}+\varepsilon_{(n-1)})\}$, where, small thicknesses $\{\varepsilon_1>\varepsilon_2>\ldots>\varepsilon_{(n-1)}\}$ are added to avoid undesirable superstrate interference in regions other than where an assembly is planned in a given step. Additionally, the assembly would need to happen in a specific sequence to avoid undesirable superstrate interference. This sequence always requires assembling feedstock or dummy feedstock in such a way that at every assembly step, a given feedstock being assembled has its top surface higher than all other previously placed feedstocks or dummy feedstocks.
   b) Varying the thickness of the underlying adhesive layer described above that can, in one embodiment, be achieved by using distinct pre-calculated total volumes deposited during the inkjetting step underneath each feedstock.
   c) Fabricating the various feedstock source wafers to have a pre-calculated and distinct thickness of the semiconductor layer on the buried sacrificial layer.
   d) Etching rectangular trenches into the product wafer such that these trenches have a lateral dimension slightly larger than the corresponding feedstock dimensions (e.g., 0.25 micrometers), and the etch depth at each feedstock location is chosen independently to ensure that the top of the corresponding feedstock ends up at a pre-determined height including the feedstock and its adhesive layer.

2. Ensuring that every assembled feedstock is substantially the same height after assembly. However, each feedstock being assembled is slightly higher prior to adhesive curing step as adhesive curing typically involves a 2-10% volumetric shrinkage. As an example, an adhesive with 10% shrinkage (see discussion above concerning adhesive formulations) and a 50 nm initial thickness will provide a~5 nm clearance in the uncured state to allow precise location of feedstock in the uncured state (see discussion above). The exemplar approaches in 1.a) through 1.d) above used independently or in combination also allows one to obtain substantially the same height of each feedstock after assembly.

The methodology discussed in Approach 1 may optionally require a planarization step to ensure that the subsequent processing can be achieved correctly (e.g., photolithography depth of focus constraints). To solve this planarization problem, an inkjet based planarization approach can be used. Alternatively, a chemical mechanical polishing (CMP) process can also be used to achieve the same.

Consider an exemplar ASIC die of dimensions $l_d \times w_d = 10$ mm×10 mm. Each feedstock is $l_f = 100$ μm on a side. The number of feedstocks per die is then $n_f = 10,000$. Assuming there are $n_{ftyp} = 20$ types of feedstock, each with a stockpile of $n_{fstk} = 10$ feedstock wafers for efficient utilization (as described above). This leads to about 200 pick-and-place steps, with each step transferring an average of 50 feedstocks per die. Assuming there are $n_{dpw} = 300$ dies per wafer, this is equivalent to an average of 15,000 feedstocks transferred per pick-and-place step in total.

The text below discusses the EDA (electronic design automation) design and CAD (computer aided design) flows required to design the feedstock configurable ASIC System on Chip (SoC). Typically, the ASIC SoC comprises billions of transistors which are placed optimally to meet the performance/speed, area and power specifications. In order to efficiently design the ASIC SoC, i.e., meeting design specifications with lower turn-around time (TAT) to market, there exists third-party EDA CAD tools to simplify the design process. Similar to standard cell based ASIC SoC, feedstock configurable ASICs also make use of these EDA tools.

The EDA flow for feedstock configurable ASICs tries to reuse most of the existing EDA CAD tools. However, there are few EDA process steps in the entire design flow which are developed in-house. However, the in-house solutions can be easily integrated with the existing EDA tools to ensure seamless deployment of end-to-end solution.

As described earlier, a feedstock consists of layers of transistors, interconnects and dielectrics. The selection and placement of feedstocks is done optimally to meet the design specifications and will be discussed in the following sections. The feedstock cell comprises a base layer (made of transistors, standard cells, etc.) and n metal layers, where n>=1 with vias which form interconnects. The feedstock may include an internal power grid structure that includes rings, straps, stripes, follow pins, etc. to power the transistors and other components. The feedstock configurable SoC may include different types of feedstocks as mentioned below. However, this list might not be exhaustive and types of feedstock should not be limited to these.

a. Logic Feedstocks: Micro-scale circuit which is used to implement, design logic design elements in SoC.

b. Memory Feedstocks: Micro-scale circuit which is used to implement, design memory design elements (SRAM, etc.) in SoC.

c. IO Feedstocks: Micro-scale circuit which is used to implement, design IO circuitry in SoC.

d. Macro Cells Feedstocks: Micro-scale circuit which is used to implement, design and interface macro cells in SoC.

e. Mixed Feedstocks: Micro-scale circuit that includes design elements which exist in other types of feedstock.

A typical SoC includes different types of feedstocks as discussed above. Each type of feedstock can be instantiated multiple number of times. The design flow allows heterogeneous integration of different types of feedstocks. By heterogeneous, it is meant that these feedstocks can be manufactured using different materials, such as Si, GaAs, etc., different technology nodes and memory technologies. Furthermore, different types of feedstocks, such as logic feedstock, memory feedstock, IO feedstock, etc. may have varying thickness values. This can be due to the difference in number of metal layers, pitch values, technology nodes, etc. This type of SOC also allows integration of hard intellectual property (IP) blocks, soft IP blocks, similar to standard cell ASIC flow.

Figure 24:
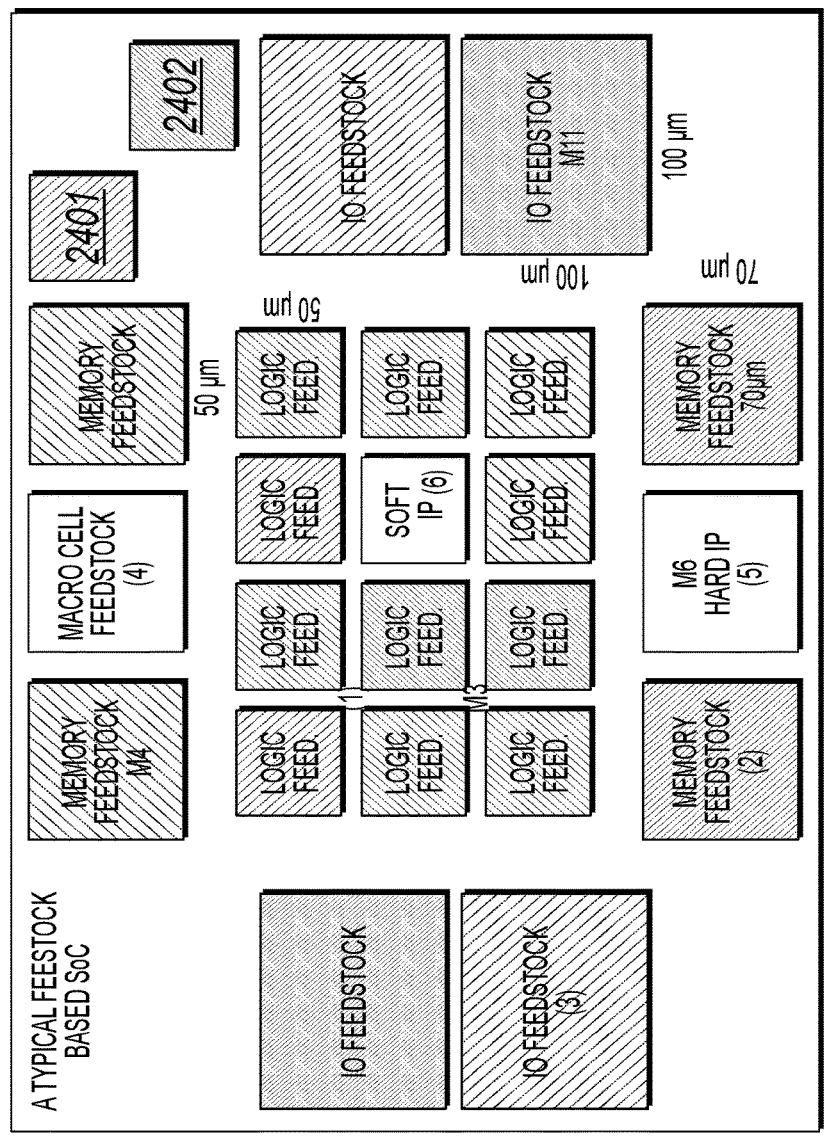
FIG. 24 shows one of the possible configurations of a feedstock configurable SoC in accordance with an embodiment of the present invention.

FIG. 24 shows one of the possible configurations of a feedstock configurable SoC in accordance with an embodiment of the present invention. It includes logic feedstocks (1) sized 50 μm*50 μm, memory feedstocks (2) sized 70 μm*70 μm, IO feedstocks (3) sized 100 μm*100 μm, macro cell feedstock (4) and hard IP block (5) each sized 70 μm*70 μm and soft IP block (6) sized 50 μm*50 μm. Furthermore, each type of feedstock has different number of metal layers and thickness. Logic feedstocks have metal 3 (M3) as the top metal layer, IO feedstocks include M11 as their top layer metal and the hard IP block has M6 as the top metal layer. The feedstocks count and arrangement may vary with the design requirements. The different shades for the same type of feedstocks indicate different design configurations for the specific type. For example, logic feedstock shaded 2401 is different in design from feedstock shaded 2402. Similarly, other types of feedstocks may have different configurations.

A discussion regarding logic feedstock design and its EDA methodology is now deemed appropriate. The structure of a logic feedstock will be first described. Next, EDA design methodology and overview of EDA design steps for logic design implementation using existing EDA tools and in-house solutions will be described. Next, novel in-house solutions developed in this flow will be described followed by discussing the novel feedstock design and feedstock placement algorithms used to design and place feedstocks in SoC, respectively. Next, the novel algorithms implemented in the backend design phase, i.e., clock tree synthesis (CTS), and post-CTS, post-Route optimizations is then discussed.

Figure 25:
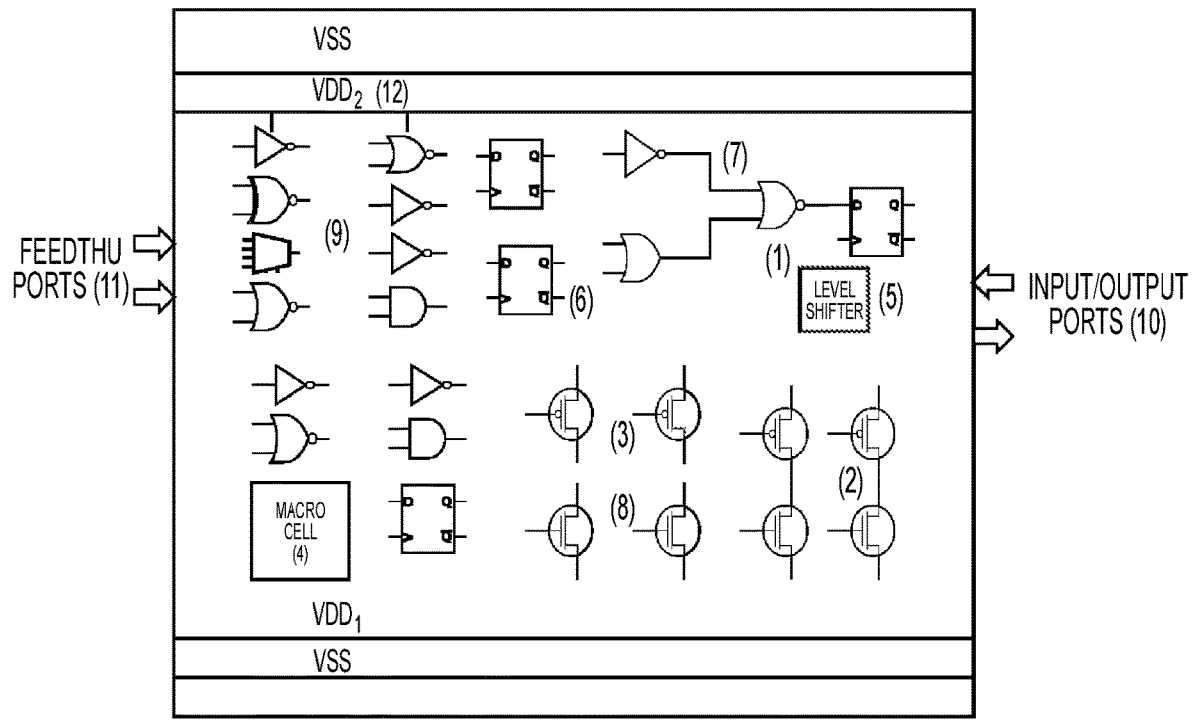
FIG. 25 illustrates a generalized logic feedstock configuration in accordance with an embodiment of the present invention.

FIG. 25 illustrates a generalized logic feedstock configuration in accordance with an embodiment of the present invention. The logic feedstock may comprise of any combination of the following components: standard cells (1), transistors (2), gate arrays (3), macro cells (4), physical only cells (5), scan cells (6), etc. The components can be connected using interconnects (7) or left open as spare transistors (8) or spare cells (9) as per the design requirements. The logic feedstock comprises of n metal layers, where n>=1. The connectivity among components might or might not belong to the same timing path or group. There exists finite number of input and output ports (10). There might exist additional ports at the periphery of feedstock to accommodate feedthrough signals (11). The feedstock may consist of an internal power grid to power the transistors, cells, etc. The power grid may comprise of any combination of the following: rings, straps, stripes, follow pins, etc. The voltage levels may vary in different regions of a feedstock forming different voltage islands (12).

Figure 26:
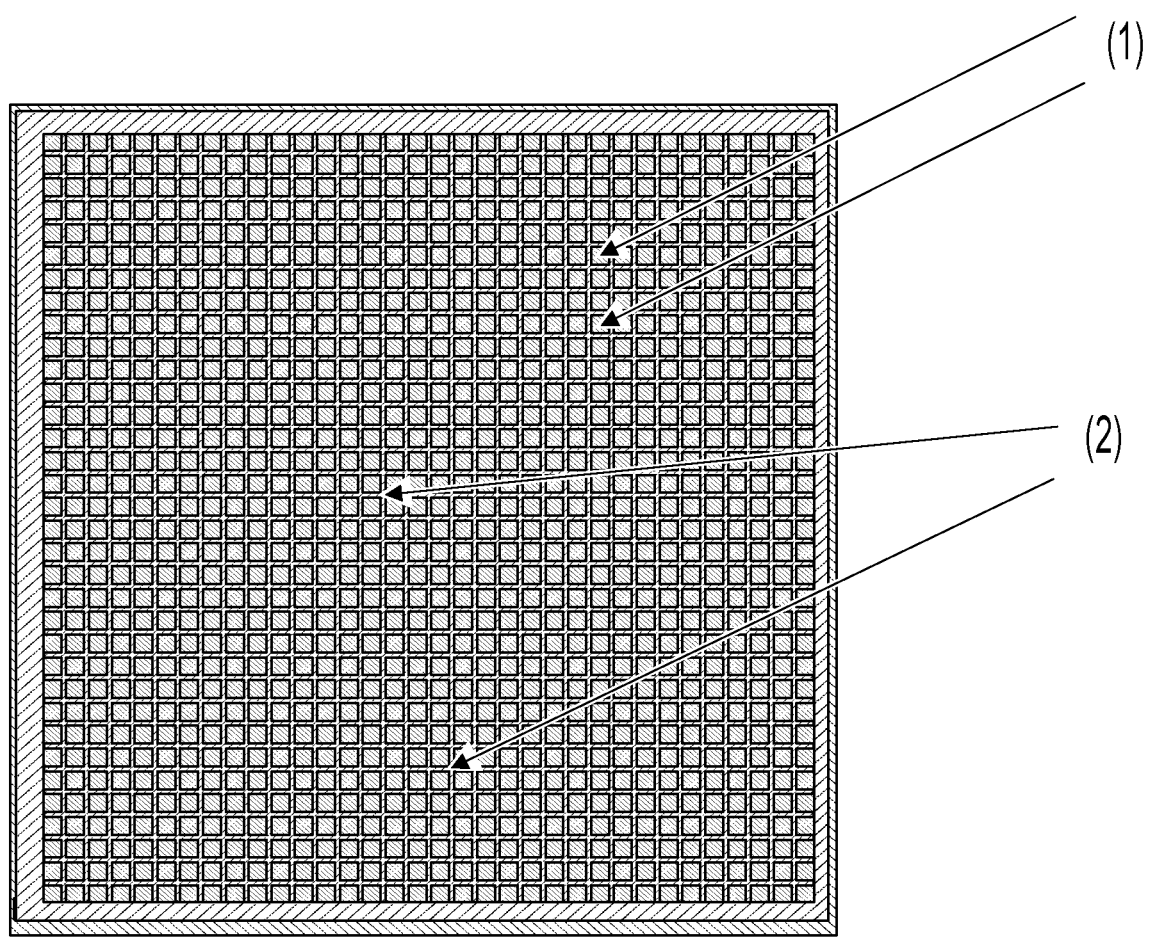
FIG. 26 illustrates a standard cell based logic feedstock configuration in accordance with an embodiment of the present invention.

FIG. 26 illustrates the standard cell based logic feedstock configuration in accordance with an embodiment of the present invention. It comprises of only standard cells (1) implemented using 32 nm technology node. All the standard cells are left open, i.e., can be treated as a sea of spare gates. In order to power the standard cells, follow-pins (2) are laid to connect the power from power straps (laid down using higher metal layers) to the standard cell power pins or follow pins. The M2A2 EDA flow discussed below makes use of these types of logic feedstocks. FIG. 26 shows the layout of this type of logic feedstock, and is generated using a Cadence Innovus tool.

Figure 27:
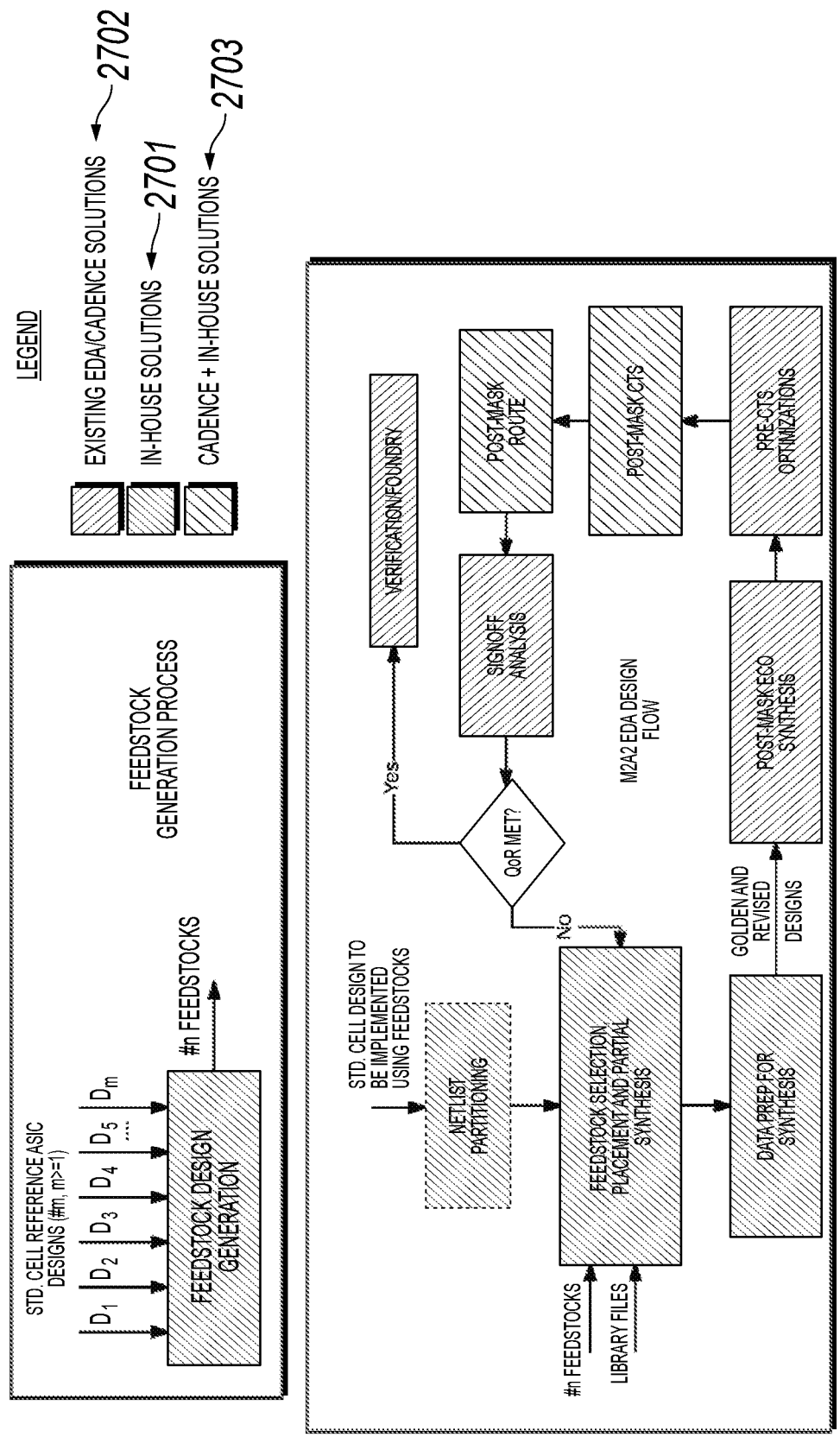
FIG. 27 describes the EDA methodology for logic design implementation of a feedstock configurable ASIC in accordance with an embodiment of the present invention.

FIG. 27 describes the EDA methodology for logic design implementation of a feedstock configurable ASIC in accordance with an embodiment of the present invention. The EDA flow includes a number of EDA process steps which are stitched in a unique manner to achieve the end goal. The flow includes some steps, such as Feedstock Design Generation, Feedstock Selection, Placement and Partial Synthesis, etc. which are developed in-house, and are highlighted in shade 2701. The design items highlighted in shade 2702 are the ones which have existing commercial EDA solutions, and are re-used in this flow. There are also certain design steps in the flow which makes use of existing EDA solutions as well as in-house solutions are developed to achieve the solution, and are highlighted in shade 2703. The steps mentioned in this flow might not be fully exhaustive or mentioned in complete details, and minor changes can be done for different designs to achieve the best QoR.

The overview of the design steps in the EDA flow is presented next. The detailed explanation on each of the steps will be discussed further below. In the feedstock design generation, limited number of finite feedstocks, n, where n>=1, are generated based on design data from multiple standard cell based ASIC SoCs. This solution is developed in-house by implementing various algorithmic techniques, such as the greedy approach based mapping, unsupervised learning and graph matching techniques, etc. Once the feedstocks are generated, it serves as the library for the flow, which is referred to herein as the "Micro-Scale Modular Assembled ASIC" (M2A2).

In the M2A2 EDA flow, the input standard cell based design may be partitioned into multiple modules in order to improve the physical and timing awareness of Engineering change order (ECO) synthesis. The design partitioning can be achieved by any of the standard partitioning algorithms, such as FM Min-Cut, Min-Flow, etc. Then, the feedstocks are selected and optimally placed in design/modules to meet the functionality and performance specifications. This solution is developed in-house, and can be implemented using various techniques, such as the greedy approach based mapping, unsupervised learning and graph matching techniques, etc. The design may be partially synthesized by the feedstock spare cells, if desired. Then, the feedstock design, placement and design data are processed to generate the collaterals in standard industry format, i.e., netlist files, and design exchange format (DEF) files. These files are inputted to the ECO synthesis tool to perform complete synthesis. Once the design data in the form of netlist and DEF files is generated, the industry standard ECO tool named Cadence Conformal ECO is used to perform post-Mask ECO synthesis. This allows synthesizing of the design using spare cells pre-placed in the feedstock configured SoC. The patch netlist files are generated, which are loaded in the Cadence placement and route (P&R) tool named Innovus to generate the synthesized netlist. All the design steps mentioned until now form the frontend design phase of the M2A2 EDA flow. It is worth mentioning that unlike the conventional standard cell based ASIC flow where synthesis is performed first followed by placement, the M2A2 EDA flow performs co-optimized placement and synthesis, i.e., placement and partial synthesis are performed together followed by the complete ECO synthesis.

The frontend design phase is followed by the backend end phase. In the backend design phase, pre-clock tree synthesis (pre-CTS) optimizations are performed first using the Cadence P&R tool Innovus. The optimizations include pin swapping, cell swapping to reduce interconnect lengths and delays, etc. Once the pre-CTS optimizations are performed, the clock tree is built. No commercial EDA solution exists today to perform post-Mask CTS, i.e., building the clock tree keeping the base layer cells frozen or fixed. In order to implement post-Mask CTS, the first Cadence Innovus tool is used to build the clock tree by inserting cells in the desired regions in SoC. The desired regions are those where spare clock tree buffers, inverters and clock gating cells are placed. Then, an in-house solution is developed to map or swap the newly added clock tree cells with existing spare cells placed in the design. This can be performed using the greedy mapping approach, graph matching techniques, etc. Once the clock tree is built without changing the base layer, routing is performed using the Cadence Innovus tool. In order to improve performance metrics, post-CTS and post-Route buffer insertion solutions are developed in-house which retain the post-Mask feature. In existing commercial EDA tools, the buffer insertion does not take place if all the cells are frozen or fixed. Thus, this solution improves design metrics, such as performance in terms of circuit speed.

Once the design is synthesized and routed, signoff analysis is performed to analyze design performance and compare it against the specifications. The signoff analysis, such as timing signoff, physical verification, power checks, etc. is performed by standard commercial EDA tools. In case the performance is not met, the feedback can be given back either to the feedstock placement phase, or the backend phase. It depends on the nature of issues observed by the signoff tools. Once the QoR is met, design is functionally verified and the GDSII file is generated which is the final deliverable of the EDA design phase to foundry.

A discussion regarding feedstock design generation algorithms is now deemed appropriate. Algorithm 1 presented by FIG. 28 implements the greedy mapping approach based feedstock generation in accordance with an embodiment of the present invention. This algorithm designs the feedstock using the iterative greedy mapping approach, which is simpler to implement but not optimal in performance.

Algorithm 2, as shown in FIG. 29, implements the feedstock design generation using optimal graph matching techniques and k-Means clustering (a.k.a. unsupervised learning, category of algorithms in Machine learning) in accordance with an embodiment of the present invention. This algorithm of designing feedstocks makes use of multiple techniques, such as min-cost bi-partite graph matching, logic restructuring, k-Means clustering, placement legalization, timing aware net and cell weighting, etc. to achieve optimal solutions in each step of the algorithm in order to get the best feedstock configurations.

A discussion regarding feedstock placement, selection and partial synthesis algorithms is now deemed appropriate. Algorithm 3 presented by FIG. 30 and Algorithm 4 presented by FIG. 31 implement the greedy mapping approach and the optimal graph matching based feedstock selection and placement, respectively, in accordance with an embodiment of the present invention.

Algorithm 3 selects and places the feedstocks in design iteratively based on the greedy mapping of windows sorted in decreasing order of the critical factor with the available feedstocks. The iterative approach does not result in the optimal solution. In order to achieve optimal mapping, Algorithm 4 is developed. It selects, places and partially synthesizes the feedstock design using optimal graph matching techniques. This algorithm makes use of multiple techniques, such as the min-cost bi-partite graph matching, logic restructuring, placement legalization, timing aware net and cell weighting, etc. to achieve good results in each part of the algorithm in order to get the optimal placement of feedstocks in the design.

Post-Mask backend design optimizations and post-Mask clock tree synthesis are now discussed. Algorithm 5, shown in FIG. 32, presents the post-Mask clock tree synthesis algorithm in accordance with an embodiment of the present invention. This algorithm can be divided into 2 phases. Phase I includes steps #1-#4, whereas, Phase II includes the remaining #5-#20 steps. In phase I, the algorithm makes use of commercial EDA solutions developed by Cadence to build the clock tree by guiding the tool to insert cells in desired regions/sites. The desired sites are those regions in the design which have spare CTS cells. Then, an in-house solution is developed as presented by phase II steps. It preserves the post-Mask feature while optimizing for the clock tree skew and insertion delays. The algorithm maps the CTS added cells in the design with spare cells placed in the design. It can be implemented either using the greedy mapping approach or the min-cost bipartite graph matching techniques.

FIG. 33 presents the Algorithm 6 which implements the post-Mask post-CTS, post-Route buffer insertion in accordance with an embodiment of the present invention. The commercial state-of-the-art EDA tools do not perform post-Mask buffer insertion. In this algorithm, timing paths are first analyzed. Then clock path and data path optimizations are performed based on spare cells availability in favorable regions of the SoC. The decision of inserting the spare buffer in violating timing paths is determined by calculating the cost associated with the timing path before and after the buffer insertion. The buffer gets inserted if it improves timing. Similarly, in the clock path optimization, skew and insertion delays are reduced. This algorithm optimizes performance using algorithmic techniques, such as the min-cost bi-partite graph matching technique, etc. to obtain the optimal solution for all the timing paths.

The design of a memory feedstock is now discussed. A memory feedstock is a micro-scale circuit which is used to implement on-chip SRAM memory on the SoC. A typical SRAM includes a bit cell array with word and bit lines, sense amplifiers, column and row decoders, timer circuitry, other peripheral circuitry, etc. The memory feedstock may include a combination of any of these memory design elements. A memory feedstock can be either self-sustainable with bit array and control circuitry, or it may consist of only bit cells array, or consist of only control circuitry, such as sense amplifiers, timers, column and row decoders, etc. It is worth mentioning that memory feedstocks can be implemented using different technologies, and heterogeneous integration of these feedstocks is supported in the design flow.

Figure 34:
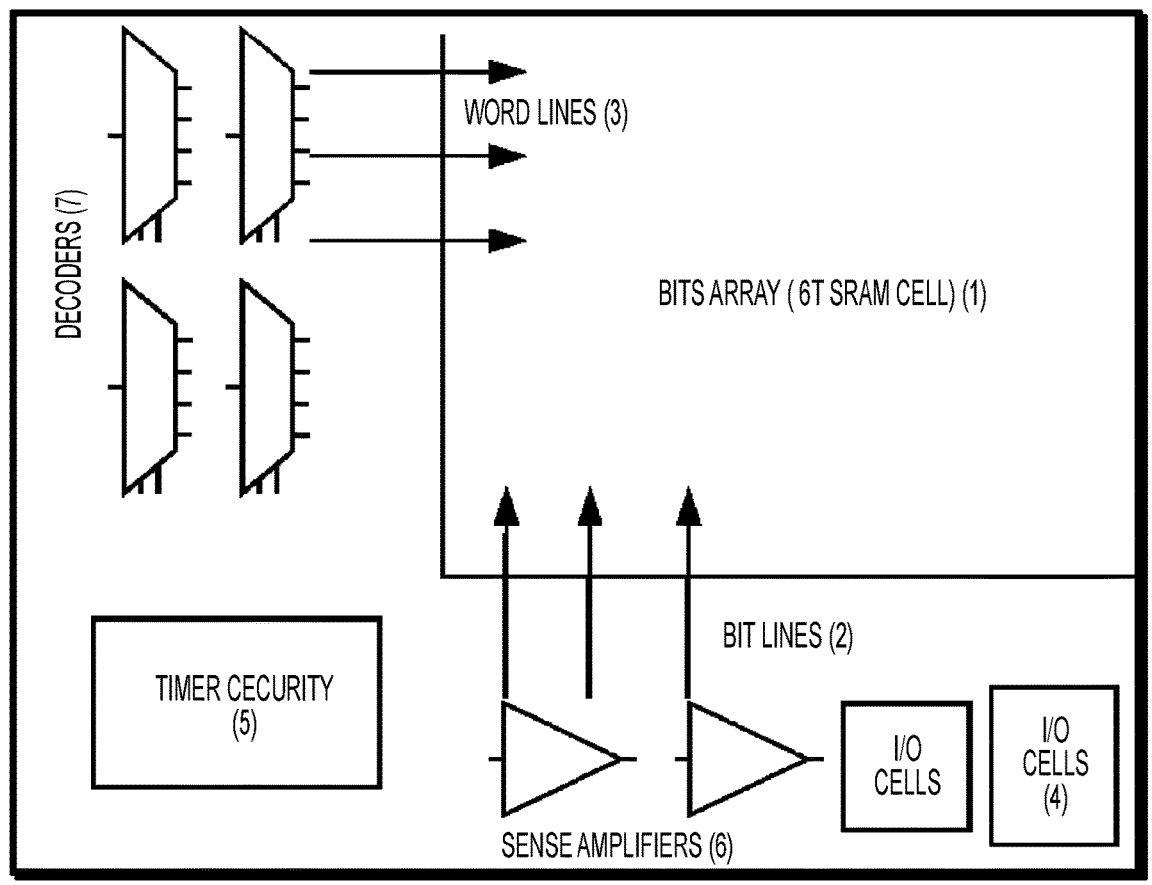
FIG. 34 illustrates one of the possible memory feedstock configurations in accordance with an embodiment of the present invention.

FIG. 34 illustrates one of the possible memory feedstock configurations in accordance with an embodiment of the present invention. The memory feedstock configuration 3400 includes basic memory design elements, such as, a bit array of SRAM cells (1), bit lines (2), word lines (3), IO cells (4), timer circuitry (5), sense amplifiers (6) and decoders (7).

IO feedstock design is now discussed. IO feedstock is a micro-scale circuit design element which is dedicated for IO operations. It includes a combination of any of the following components: IO cells, signal IO buffers, power supply pads, IO pads, ESD and de-capacitance circuitry, etc. These components may or may not be connected via interconnects. The feedstock may contain n metal layers, where n>=1. It might be possible that there exists programmable interconnects in the IO feedstock to make connections with one of the possible design elements as per designer needs.

Figure 35:
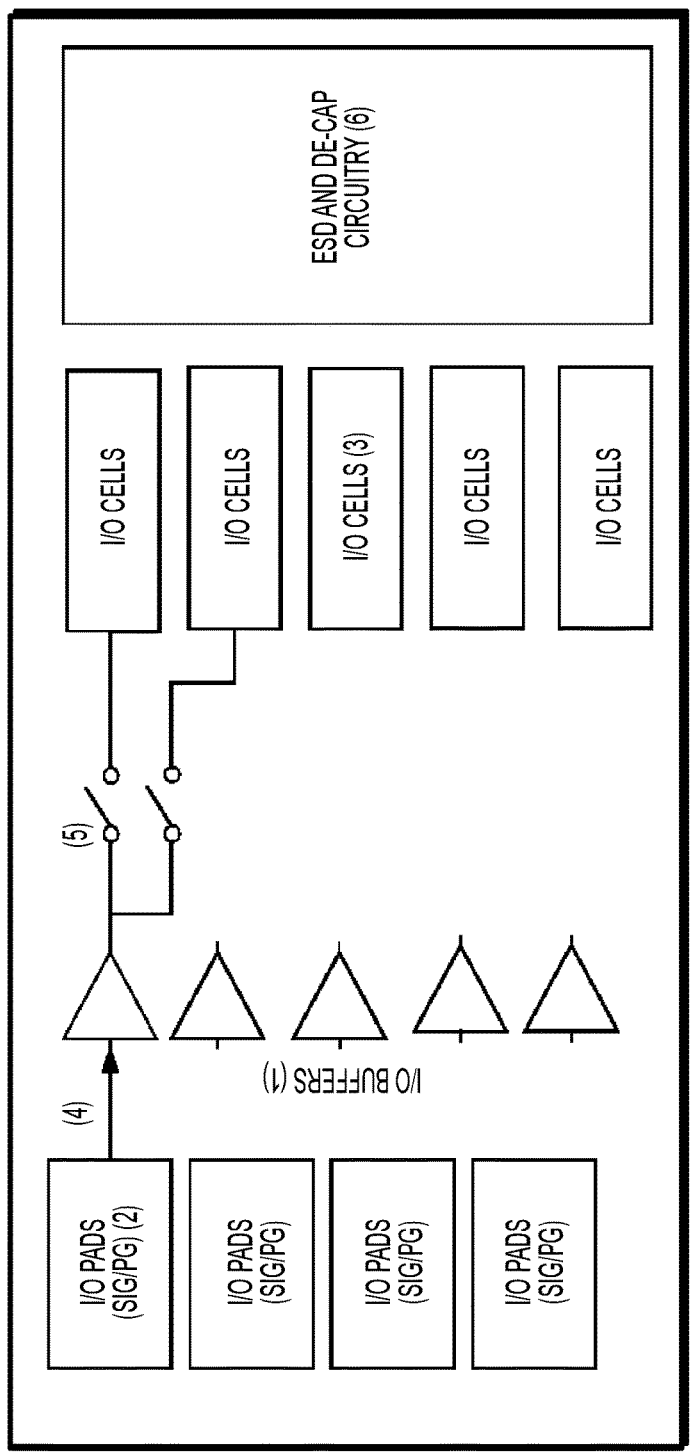
FIG. 35 shows one of the possible configurations of an IO feedstock in accordance with an embodiment of the present invention.

FIG. 35 shows one of the possible configurations of an IO feedstock 3500 in accordance with an embodiment of the present invention. IO Feedstock 3500 includes IO buffers (1), IO Pads (2) which can be either for signals or for power ground, IO cells, interconnects (4), programmable interconnects (5) and ESD/De-cap circuitry (6).

M2A2 based SoC allows integration of external IP blocks. These IP blocks can be hard IP blocks or soft IP blocks. Hard IP blocks are don't touch blocks which are completely designed. In contrast, soft IP blocks require design changes. These design changes can be implemented by making use of macro feedstocks. The components of macro feedstock depend on the type of macro cells being used in the design. Also, for seamless integration of macro cells with other components in design, such as logic, memory, etc., macro feedstock cells might be used. These feedstocks may include basic design elements with any number of metal layers. It might also contain programmable interconnects for more generic use of the feedstock.

As discussed above, existing pick-and-place techniques cannot achieve nanoscale precise assembly. Using the present invention, nanoscale precise assembly can now be achieved using a vacuum based pickup mechanism in conjunction with sub-nm precise more alignment techniques resulting in highly accurate, parallel assembly of feedstocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for assembling heterogeneous components onto a product substrate, the method comprising:
    selectively picking a subset of elements from a source wafer by a vacuum superstrate attached to said subset of elements;
    placing said selectively picked subset of elements onto an adhesive on said product substrate, wherein said placement is performed with a sub-100 nm placement precision onto said adhesive in a liquid state, wherein said adhesive is inkjetted or spin-coated onto said product substrate; and
    securely attaching said selectively picked subset of elements onto said product substrate by holding onto said subset of elements using said vacuum superstrate until said adhesive reaches its gel point.

2. The method as recited in claim 1, wherein said distribution is arbitrary.

3. The method as recited in claim 1, wherein said subset of elements are selectively picked from said source wafer using pick-and place, wherein said pick-and-place is highly parallel.

4. The method as recited in claim 1, wherein said elements are fabricated on source wafers with a buried sacrificial layer that is partially or fully removed using a bulk etch process.

5. The method as recited in claim 4 further comprising:
etching said buried sacrificial layer using an etchant, wherein said etchant comprises vapor hydrofluoric acid.

6. The method as recited in claim 5, wherein said etching of said buried sacrificial layer using said etchant is timed in such a manner that pillar-like structures remain underneath said elements post-etch.

7. The method as recited in claim 4 further comprising:
bulk-releasing said subset of elements by etching off an underlying sacrificial layer while holding a vacuum.

8. The method as recited in claim 7 further comprising:
transferring said subset of elements to an intermediate glass substrate with an ultraviolet-detacking adhesive on said intermediate glass substrate.

9. The method as recited in claim 8 further comprising:
exposing an underside of an element to selective ultraviolet light to selectively release said element.

10. The method as recited in claim 1, wherein said elements vary in size from sub-10 micrometers on a side to over 1 millimeter on a side.

11. The method as recited in claim 1, wherein assembling of said subset of elements achieves sub-50 nm scale alignment capability.

12. The method as recited in claim 11, wherein alignment between said vacuum superstrate and said product wafer is achieved using a moiré metrology scheme.

13. The method as recited in claim 12 further comprising:
performing coarse alignment using stage actuators as picked elements are brought to said product wafer;
performing fine alignment after said subset of elements are touching an uncured adhesive on said product wafer.

14. The method as recited in claim 1, wherein said subset of elements are encapsulated in a chemically inert layer of a particular thickness to protect from chemical damage and to mitigate mechanical scratching using a subsequent material removal using a chemical mechanical polishing step.

15. The method as recited in claim 1 further comprising:
selectively picking said subset of elements using a vacuum based pickup mechanism comprising said vacuum substrate; and
selectively releasing said subset of elements using an etchant gas or a mechanical pulling approach.

16. The method as recited in claim 15,
wherein said adhesive is a single or a multi-component adhesive on said product wafer.

17. The method as recited in claim 16, wherein said adhesive is cured using ultraviolet light until it reaches said gel point.

18. The method as recited in claim 17 further comprising:
implementing a subsequent vacuum deposition process to further secure said securely attached subset of elements.

19. The method as recited in claim 15, wherein microelectromechanical systems (MEMS) based valves are used to selectively activate vacuum holes to enable said vacuum based pickup mechanism.

20. The method as recited in claim 15, wherein a custom pickup layer is used for each specific pickup configuration of said subset of elements.

21. The method as recited in claim 1, wherein said method is used for constructing Application Specific Integrated Circuits (ASICs) from feedstock circuits.

22. The method as recited in claim 21 further comprising:
picking up a feedstock from a maximally depleted feedstock source wafer at a beginning of product assembly;
picking up maximum possible feedstocks from a next most depleted wafer; and
continuing to pick up said maximum possible feedstocks from said next most depleted wafer until either said product wafer is fully populated with feedstocks of one type or an entire stockpile of a given feedstock has been accessed.

23. The method as recited in claim 1, wherein said subset of elements from said source wafer has access holes to an underlying sacrificial layer.

* * * * *

UNITED STATES PATENT AND TRADEMARK OFFICE
CERTIFICATE OF CORRECTION

PATENT NO. : 11,469,131 B2
APPLICATION NO. : 16/472766
DATED : October 11, 2022
INVENTOR(S) : Sreenivasan et al.

It is certified that error appears in the above-identified patent and that said Letters Patent is hereby corrected as shown below:

In the Specification

Please replace "more" at Column 1, Line 19 with "moiré".

Please replace "post-CT S" at Column 3, Line 55 with "no space between post-CTS".

Please replace "more" at Column 5, Line 2 with "moiré".

Please replace "more" at Column 12, Line 34 with "moiré".

Please replace "… >($t_n - t(_n - t_{(n-1)} + \varepsilon_{(n-1)})$}" at Column 14, Line 40 with "… > ($t_n - t_{(n-1)} + \varepsilon_{(n-1)}$) }".

Please replace "more" at Column 20, Line 36 with "moiré".

Signed and Sealed this
Second Day of January, 2024

Katherine Kelly Vidal
*Director of the United States Patent and Trademark Office*